United States Patent [19]

Collins et al.

[11] Patent Number: 5,449,017
[45] Date of Patent: Sep. 12, 1995

[54] PROXIMITY SENSING PROBE

[75] Inventors: Timothy R. Collins, Cologne; Robert T. Chinnock, Victoria; Robert C. Grant, Eden Prairie; Dean T. Hamilton, Cologne, all of Minn.

[73] Assignee: Fluoroware, Inc., Chaska, Minn.

[21] Appl. No.: 375,185

[22] Filed: Jan. 18, 1995

Related U.S. Application Data

[63] Continuation of Ser. No. 194,152, Feb. 9, 1994, abandoned, which is a continuation of Ser. No. 19,039, Feb. 19, 1993, Pat. No. 5,316,035.

[51] Int. Cl.⁶ .................... F16K 23/00; G08B 21/00
[52] U.S. Cl. .................... 137/312; 340/605; 324/693
[58] Field of Search .......... 137/551, 312, 78.1; 340/605, 604; 324/686, 693, 700

[56] References Cited

U.S. PATENT DOCUMENTS

| | | | |
|---|---|---|---|
| 3,990,462 | 11/1976 | Elftmann et al. | 134/102 |
| 4,110,739 | 8/1978 | Kidd | 340/605 |
| 4,197,000 | 4/1980 | Blackwood | 354/323 |
| 4,286,541 | 9/1981 | Blackwood | 118/52 |
| 4,406,303 | 9/1983 | Kilmoyer | 137/554 |
| 4,449,396 | 5/1984 | Bzdula | 73/61.1 |
| 4,569,365 | 1/1986 | Namand et al. | 137/554 |
| 4,609,575 | 9/1986 | Burkman | 427/426 |
| 4,639,282 | 1/1987 | Moritz | 156/53 |
| 4,663,614 | 5/1987 | Rauchwerger | 340/605 |
| 4,677,373 | 6/1987 | Kobayashi et al. | 324/65 |
| 4,760,326 | 7/1988 | Bird | 324/61 |
| 4,766,368 | 8/1988 | Cox | 324/61 |
| 4,862,066 | 8/1989 | Sato et al. | 340/620 |
| 4,878,107 | 10/1989 | Hopper | 357/72 |
| 4,977,929 | 12/1990 | Chinnock et al. | 137/863 |
| 5,002,086 | 3/1991 | Linder et al. | 137/312 |
| 5,005,407 | 4/1991 | Koon | 73/209 |
| 5,078,004 | 1/1992 | Nyseth | 73/861.55 |
| 5,109,202 | 4/1992 | Akiba | 340/605 |
| 5,121,630 | 6/1992 | Calvin | 73/73 |
| 5,129,415 | 7/1992 | Runyon et al. | 137/113 |
| 5,142,824 | 9/1992 | Le Compagon et al. | 49/349 |
| 5,151,660 | 9/1992 | Powers et al. | 324/689 |
| 5,159,276 | 10/1992 | Ready, III | 340/605 |
| 5,190,069 | 3/1993 | Richards | 137/312 |
| 5,214,387 | 5/1993 | Fenner | 340/605 |

OTHER PUBLICATIONS

Gordon Products, Inc., Bulletin SW-2.
Filter Drawers Pull-Out for Easy Maintenance, Model 4100, "Admitted Prior Art".
Mercury, Spray Processing Systems, FSI International, "Admitted Prior Art".

*Primary Examiner*—A. Michael Chambers
*Attorney, Agent, or Firm*—Palmatier, Sjoquist & Helget

[57] ABSTRACT

A capacitive proximity monitoring device for corrosive atmosphere environments comprising a capacitance field element or sensing element disposed in such a corrosive atmosphere environment and being made of conductive plastic resistant for such a corrosive atmosphere environment. The field element may be a functional part of a functional device that performs a function with respect to the presence of the liquid being sensed; and in some cases the field element is nonfunctional with respect to the liquid, but functional and sensing the capacitance and determining the presence or absence of liquid.

17 Claims, 14 Drawing Sheets

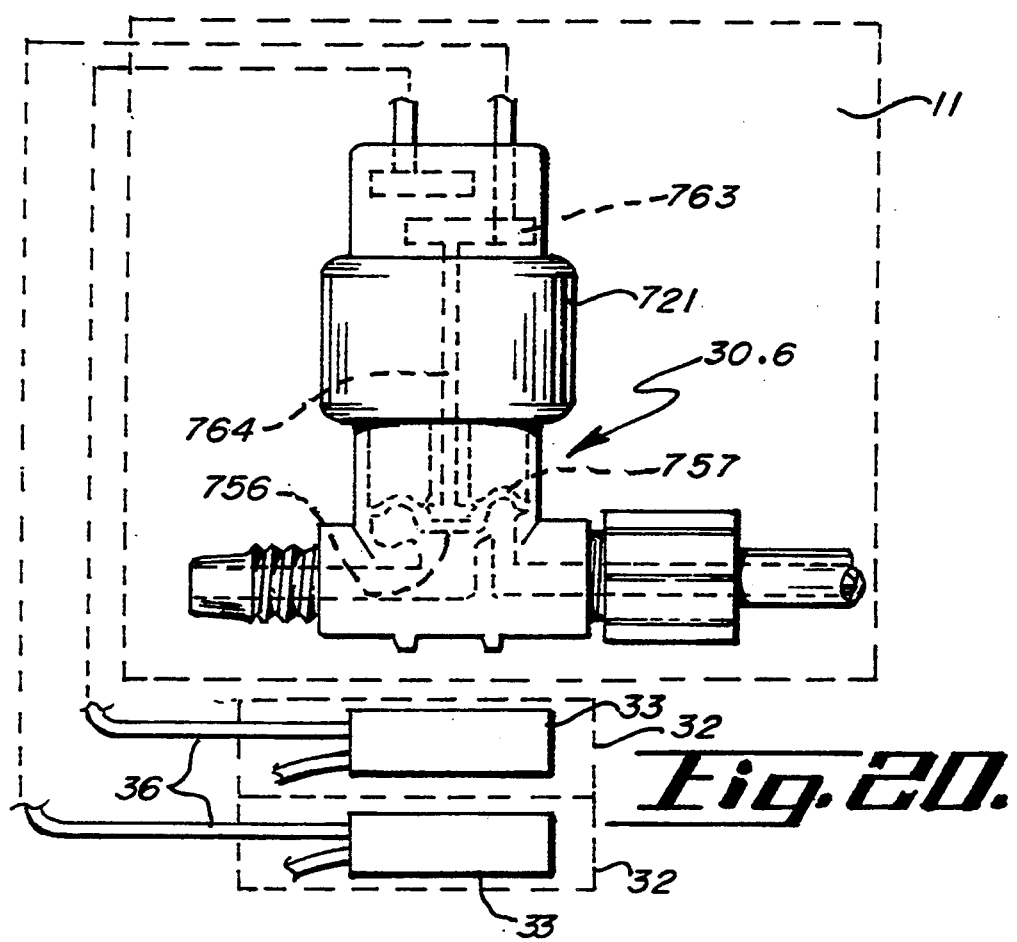

PROXIMITY SENSING PROBE

This is a continuation of application Ser. No. 08/194,152, filed on Feb. 9, 1994, now abandoned, which is a continuation of application Ser. No. 08/019,039, filed on Feb. 19, 1993, now U.S. Pat. No. 5,316,035.

This invention relates to a monitoring device for the operating conditions of equipment necessarily existing in a highly corrosive environment as may be encountered in the semiconductor industry in the processing of semiconductor wafers into circuit chips.

BACKGROUND OF THE INVENTION

In the semiconductor industry especially, and in other industries as well, extremely severe conditions are encountered in process equipment because of highly corrosive atmospheric conditions, or environment, which exist at or adjacent to processing equipment. Such corrosive atmospheric environments are extremely hard on monitoring equipment, particularly because metals which are conventionally used in such monitoring devices cannot reliably stand up to the corrosive environment for long periods of time so that the equipment may be safely and efficiently operated throughout the service life of the equipment.

The highly corrosive environment is created by one or more hazardous chemicals which are approved for use in the semiconductor industry, and which may exist in liquid or gaseous form, alone or in combination with other of such chemicals. A partial list of such chemicals includes those identified as follows:

| | |
|---|---|
| Acetic Acid | Acetone |
| Ammonium Fluoride | Ammonium Hydroxide |
| Antimony Potassium Tartrate | ceric ammonium nitrate |
| ceric ammonium nitrate | Choline |
| EKC 130-photoresist stripper | Ethylene Glycol |
| Ferric chloride | Hydrocholoric Acid |
| Hydrofluoric Acid | Hydrogen Peroxide |
| IPA-isopropyl alcohol | Methanol |
| n-Butyl Acetate | Nitric Acid |
| PBR 1 | Phosphoric Acid |
| Potassium ferrocyanide | Potassium Hydroxide |
| potassium phosphate | PRS 1000 |
| Sodium Hydroxide | Sulfuric Acid |
| Tannic Acid | |
| TMAH-tetramethylammonium hydroxide | |

These various chemicals must be delivered to processing equipment, and in order to do so, liquid transporting systems carry the liquid chemicals from replaceable supply tanks through pumping and regulating stations and through temporary storage facilities so that the chemicals are readily available at the processing stations. Of course, such liquid chemical transport systems must involve pipes and tubes, valves and fittings, oftentimes filters and flow meters, and related devices, most of which are made of plastics resistant to the deteriorating effects of harsh chemicals. Of course, anything mechanical is subject to potential leakage, and such leakage can create extremely hazardous conditions, both to the processing of semiconductor wafers or other products, and also to personnel who may have to tend and maintain the processing equipment and transport systems.

Although capacitance proximity devices such as switches have been successfully used in particular safe environments for determining existence of liquids or objects, and have used sheet metal sensors remote from the operating circuitry and proximity switch, such capacitance proximity devices have not been successfully used in corrosive environments because of the lack of reliability.

SUMMARY OF THE INVENTION

An object of this invention is to produce a monitoring device for reliably sensing the electrical characteristics of a target media within a target zone existing in a corrosive atmosphere environment. Such a target media may be a liquid or a solid article, the presence or absence of which is being determined in the target zone. The electrical characteristics of the target media, i.e., capacitance or resistance, are distinctly different than air or other fluid ambient media in the target zone into and out of which such a target media moves. The corrosive atmosphere environment, which embraces the target zone and target media, comprises vapors of acids, bases, or other chemicals.

A feature of the invention is the use of a sensing element made of a conductive plastic which is resistant to deterioration under the influence of the corrosive atmosphere environment which embraces the target zone and target media. The conductive plastic sensing element is also resistant to such acids or bases or other chemicals which, in some applications, actually touch the sensing element. Such conductive plastic is rendered conductive by carbon filling the plastic, or by adding iron particles to the plastic.

Another feature of the invention is the use of such conductive plastic sensing elements in combination with circuit means capable of sensing minute changes of current, to create a sensing field in the target zone, as to determine changes of electrical capacitance of the media in the target zone. When the target media moves into the target zone, a change of current in the circuit means produces an indication which may be interpreted as a determination of the presence of the target media. The target media may or may not actually engage the conductive plastic sensing element. It is believed that, where only one sensing element adjoins the target zone, the current changes actually indicate changes of electrical capacitance in the target zone induced by the presence or absence of the target media in the target zone.

Still another feature of the invention is the use of a pair of spaced conductive sensing elements adjacent the target zone and connected to the circuit means and establishing a sensing field between the sensing elements and through at least a portion of the target zone. When the target media is present in the target zone an indication is produced by the circuit means. The indication produced in this arrangement is substantially stronger than where only a single conductive plastic element adjoins the target zone. In applications where the target media actually spans between and engages both conductive plastic sensing elements, the circuit means produces a similar indication denoting the presence of the target media in the target zone.

An additional feature of the invention is to incorporate, in a functional apparatus such as a valve or coupling for tubing, such a conductive plastic sensing element serving also as a functional portion of the apparatus, to accomplish the purpose of creating a sensing field in a target zone to determine the change of electrical characteristics in the target zone when the target media, i.e., the liquid flowing in the functional apparatus, is present.

A still further feature of the invention is a pair of conductive plastic sensing portions formed integrally of and in one piece with an electrically insulating plastic portion to confront a target zone with a sensing field between the conductive plastic sensing portions and to confront or engage the target media. The target media may engage the conductive and insulating plastic portion to conduct between the conductive plastic sensing portions.

The circuit means to which the conductive plastic sensing element (or elements) is connected is located out of the corrosive atmosphere environment and is connected to the sensing element by a coaxial cable which is hermetically sealed to the conductive plastic sensing element. The circuit means incorporates a current sensing means such as a capacitance proximity switch of the type manufactured and sold by Gordon Products, Inc. of Brookfield, Conn., as to produce an indication of the change of current, interpreted as the presence or absence of the target media in the target zone. Such sensing means are useful regardless of whether the target media, liquid or solid, actually engages one or both conductive plastic sensing elements, or simply confronts such an element in spaced relation.

The plastics used in the sensing element and in the sheath for the cable are resistant to the chemicals in the corrosive environment, and may comprise any of a number of suitable plastics,, especially those identified as polyvinylidine fluoride (PVDF), polyetheretherketone (PEEK), and perfluoroalkoxy (PFA, Teflon®).

In one embodiment, the presence or absence of liquid in a tube is to be determined. The conductive plastic sensing element may comprise the threaded nut of a tube coupling, as to create the sensing field extending at least partially into the interior of the tubing which comprises the target zone. The liquid in the tubing and coupling comprises the target media, the presence of which is to be determined. The current related to the sensing field changes when the liquid target media is present versus air or gas in the tubing when the liquid target media is absent, thereby producing an indication indicating the presence or absence of the target media.

In another embodiment, the conductive plastic field element may actually engage the target liquid under certain conditions and will, as a part of such a monitoring device, indicate when the liquid is touching the field element. An example is a diaphragm valve existing in a corrosive atmosphere environment, wherein the valve housing defines a target zone, and the leakage liquid comprises the target media and air or gas in the valve housing comprises an ambient media. A retainer ring, which holds the diaphragm in place and does not ordinarily touch any liquid, constitutes the conductive plastic sensing element. In the event of leakage around the diaphragm or of rupture of the diaphragm, the retainer or sensing element is wetted and is actually touched by the leakage liquid, whereupon, the monitoring device will sense a change of capacitance and will indicate the changed condition which may be interpreted as a leakage of such liquid.

In such a diaphragm valve, the monitoring device may have its sensitivity adjusted as to alternately determine the presence or absence of liquid in the ordinary flow courses of the valve or adjacent the valve seat.

In such a diaphragm valve, a conductive valve stem, almost completely enclosed within a plastic sleeve integral with the diaphragm, may also be connected to the circuit means, to form one plate of a capacitor, the other plate being established by the conductive plastic retainer ring, or sensing element. The two capacitor plates create a sensing field between them in the target zone. Leakage liquid, possessing electrical characteristics and forming the target media when present, does not engage both capacitor plates, but does change the capacitance between the plates, thus producing a change in the current in the circuit means and an indication of the presence of the target media, i.e., the leakage liquid. It has been experienced that the change of current in the circuit means may be 6 to 8 times greater when two capacitive plates or sensing elements are used as compared to the use of a single conductive plastic sensing element as above described. Moreover, it is found preferable to connect the conductive plastic retainer ring, or sensing element, to ground or to the grounded shield of the coaxial cable while the valve stem is connected to the signal carrying central wire of the cable. This arrangement minimizes the effect of outside influences, such as a person's hand touching the housing or plastic shroud of the valve.

In still another arrangement of such a valve, the retainer ring which holds the diaphragm in place may have a compound formation wherein two conductive plastic portions, forming sensing elements, are spaced apart by and molded integrally with a nonconductive plastic portion. A sensing field is created between the sensing elements and in the adjoining target zone. If leakage liquid, i.e., the target media, is present in the zone, the current in the sensing elements and circuit means is changed. If the leakage liquid actually spans across between the conducive plastic portions or sensing element, current conduction through the leakage liquid or target media occurs to produce a change in the current in the circuit means.

In another form the conductive plastic field element, resistant to the corrosive atmosphere, will be affixed on the plastic sight tube of a flow meter to sense the media within the sight tube which is the target zone. The target media, in this form, comprises the movable "float" or impelled element in the sight tube and has electrical characteristics different than the other ambient media, i.e., the flowing liquid, in the sight tube. When the float, or target media, moves upward in the sight tube to the level of the sensing element, the float changes the capacitance adjacent the sensing element, and the monitoring device indicates the change of condition which will be interpreted as a certain liquid flow rate.

In another variation, a pair of conductive plastic sensing elements, each connected to the circuit means to create a sensing field between them, are located at opposite sides of the sight tube as to create a more sensitive monitoring device producing substantially more current change when the float or target media moves into the target zone between the sensing elements.

Similarly, a plastic tank, which may be a part of a processing equipment to contain a processing liquid, may carry a conductive plastic field element to withstand the corrosive atmosphere environment in which the tank exists, and be a part of such a monitoring device to determine the level of target liquid, or target media, within the tank.

Such a plastic tank may also carry a pair of conductive plastic sensing elements side by side on the tank wall to create a sensing field between them which extends, at least partially, into tile interior of the tank or target zone. When the level of liquid, i.e., the target media, in the tank rises into proximity with the conductive plastic sensing elements, the currents therein and in the circuit means will change to produce an indication of the liquid adjacent the sensing elements.

In the event the tank is metal and has a protective plastic lining, the conductive plastic sensing elements may be located on the inside of the tank to create a sensing field in or adjacent the liquid in the tank.

Junction boxes for protective ducts confining tubes and pipes delivering chemicals may have conductive plastic sensing elements attached and functioning to determine the existence or level of collected leakage liquids, in substantially the same manner as such sensing elements are attached to plastic tanks or drums.

Another feature of the invention is a probe which may be inserted into an apparatus such as a valve for the purpose of creating a sensing field in a target zone to sense the electrical characteristics of the ambient media adjacent the probe and to also sense the electrical characteristics of a target media that may move into the target zone. Such a probe has a tip portion with concentric conductive plastic sensing elements separated by insulating plastic elements, all of which are formed of plastics resistant to the deteriorating effects of the corrosive atmosphere environment, and wherein the concentric plastic elements, conductive and nonconductive, are all formed integrally and in one piece with each other and connected with the central wire portion and grounded shield conductor of a coaxial cable.

In all of the foregoing embodiments and variations of the invention, the changes in current at the conductive plastic sensing element, or elements, and in the circuit means, produces indications which may take the form of a visual or audible alarm, a gauge indicia or an electrical or similar signal to induce some course of action such as the operating of a valve, as to correct a physical change related to the sensed target media.

Wherein this application reference is made to a conductive plastic, the plastic is carbon filled, or the plastic may have iron particles added integrally and distributed throughout the plastic. Such plastics as are used in the conductive plastic sensing element, and other plastics that are used, are all preferably resistant to the deteriorating effects of corrosive atmosphere environment, and the plastics of that nature are preferably formed of polyvinylidine fluoride (PVDF); but otherwise the such plastic may consist of polytheretherketone (PEEK), or perfluoroalkoxy (PFA, Teflon®) or other plastics known to persons of skill in the art.

The conductive plastic form of capacitance sensing element will withstand the corrosive environment embracing it so that the monitoring device may continue reliably functioning over extended periods of time. The conductive plastic field element may take any of many physical forms, depending upon the use to which it is being put.

BRIEF DESCRIPTION OF THE DRAWINGS

FIG. 20 illustrates another modified form of the invention as applied to a valve.

DETAILED SPECIFICATION

Figure 1:
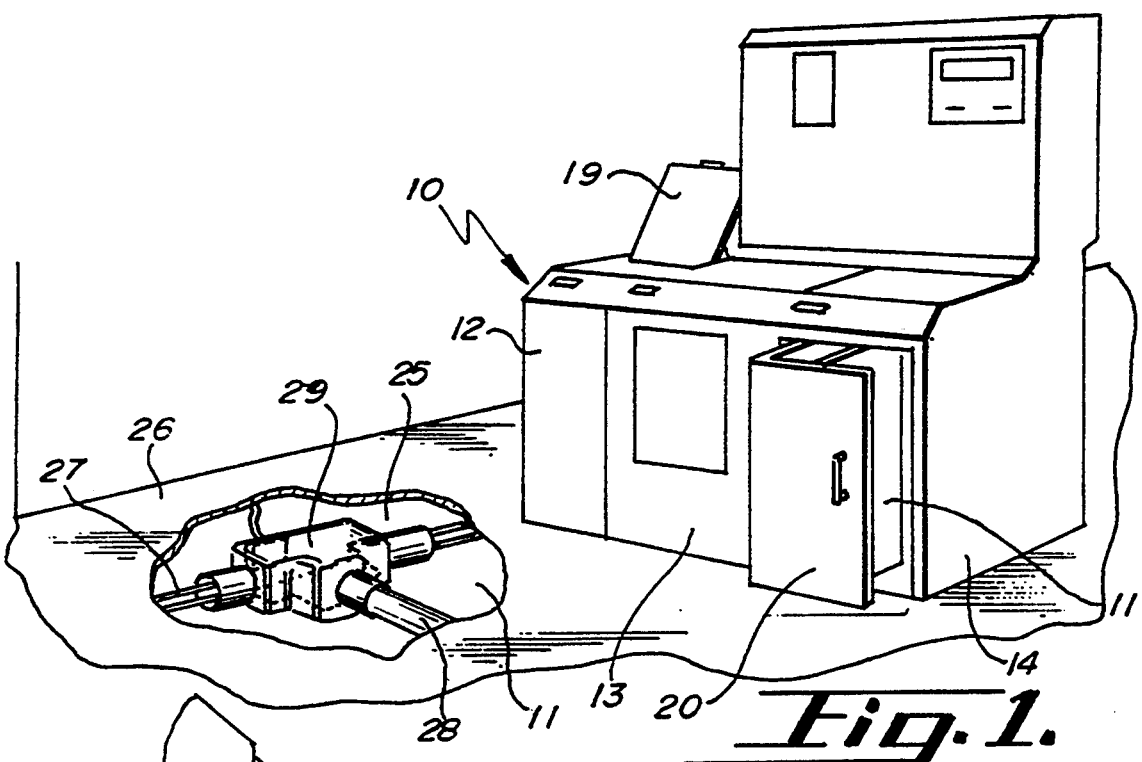
FIG. 1 is a perspective view of a piece of processing equipment and supply ducts illustrating the corrosive atmosphere environment in which the present invention exists.

FIG. 1 illustrates at least part of process equipment 10 used in processing semiconductor wafers during the manufacture of circuit chips, as to illustrate one example of means providing a source of creating a corrosive atmosphere environment in which the present invention exists. The equipment is indicated in general by the numeral 10 and is illustrated here to emphasize that a corrosive atmosphere environment exists around most of the components in such processing equipment. Although the processing equipment 10 is unique to the semiconductor industry for purpose of processing semiconductor wafers in the manufacture of circuit chips, similar conditions of corrosive atmosphere environments certainly exist in other industries and in relation to other processing equipment and chemical transport and storage equipment.

With respect to the processing equipment 10 illustrated in FIG. 1, the corrosive atmosphere environment which is indicated in general by numeral 11 exists in all of the major components of the processing equipment, and particularly the canister console 12, the processing console 13 and the solution console 14.

Figure 10:
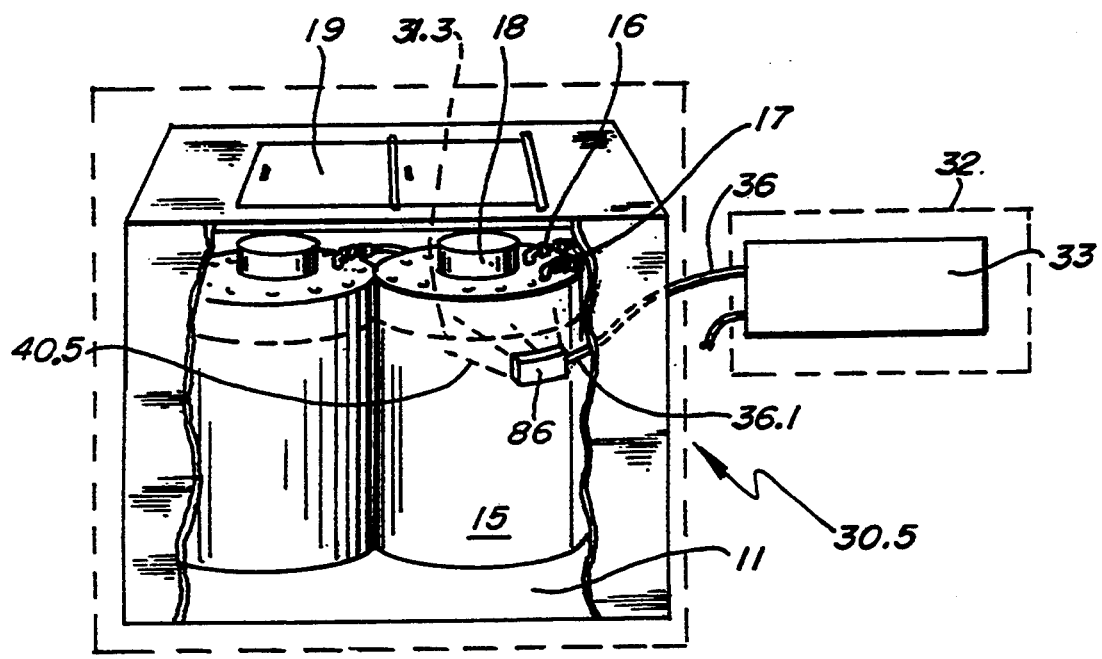
FIG. 10 is a diagrammatic perspective view of the canister console of the processing equipment of FIG. 1, partly broken away to illustrate the interior thereof.
Figure 11:
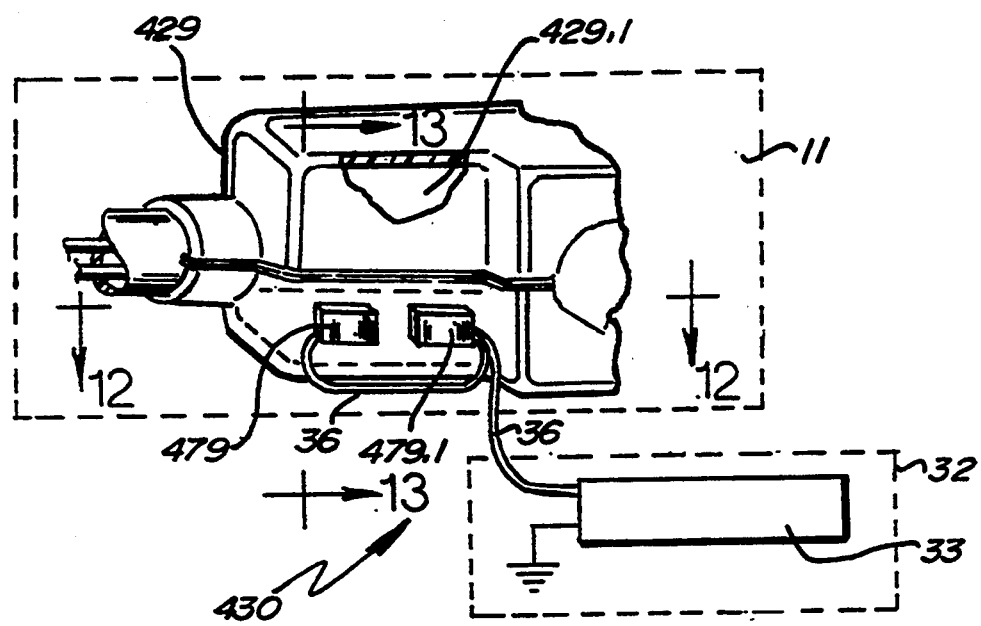
FIG. 11 is a detail perspective view of a modified form of the invention applied to a junction box enclosing certain fittings for the chemical supply tubes.
Figure 12:
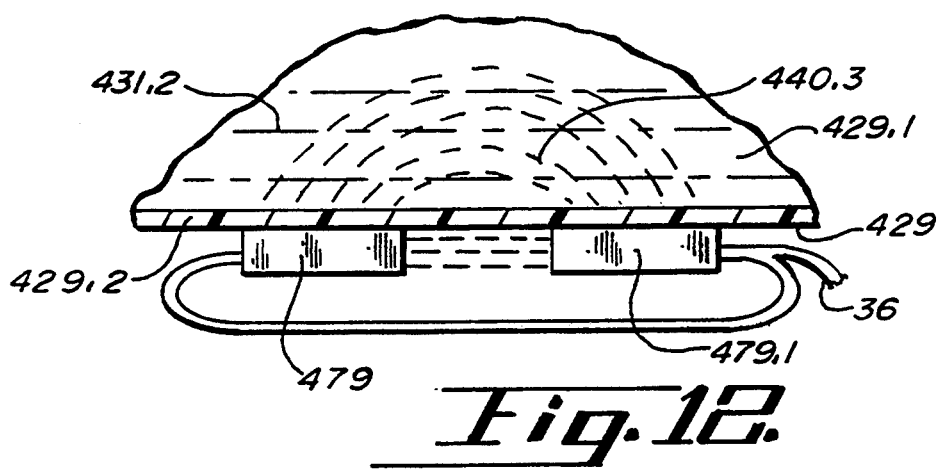
FIG. 12 is an enlarged detail section view taken approximately at 12—12 of FIG. 11.
Figure 13:
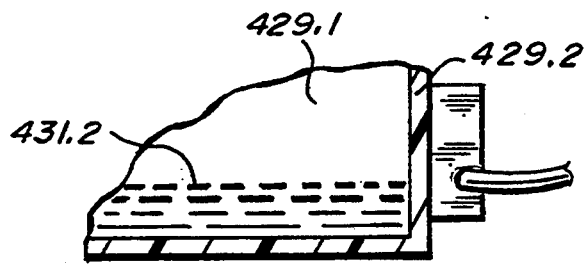
FIG. 13 is an enlarged detail section view taken approximately at 13—13 of FIG. 11.

The canister console may contain a number of tanks or drums 15, as illustrated in FIG. 10, to contain process chemicals which are drawn from the tanks 15 through fittings 16 and tubes 17 for use in the process console 13. The interior of the canister console inherently comprises an corrosive atmosphere environment 11 because of the continued existence of process chemicals being drawn from the tanks 15, which are refilled from time to time through their removable covers 18. As illustrated, the canister console has a lid or cover 19 providing access into the interior of the console for supplying chemicals into the tanks as refill is needed. In some equipment, such tanks may be directly connected to a remote source of chemical, but the corrosive atmosphere environment 11 would continue to exist in the console 12.

The process console 13 confines process chambers where silicon wafers are actually exposed to various chemicals and such process chambers are well-known to persons of skill in the industry and are illustrated in general in existing U.S. Pat. Nos. 3,990,462, 4,197,000 and 4,286,541. The process console also contains tubings and fittings and valves, all of which may be subject to leakage from time to time, thereby creating a corrosive atmosphere environment within the process console.

Figure 2:
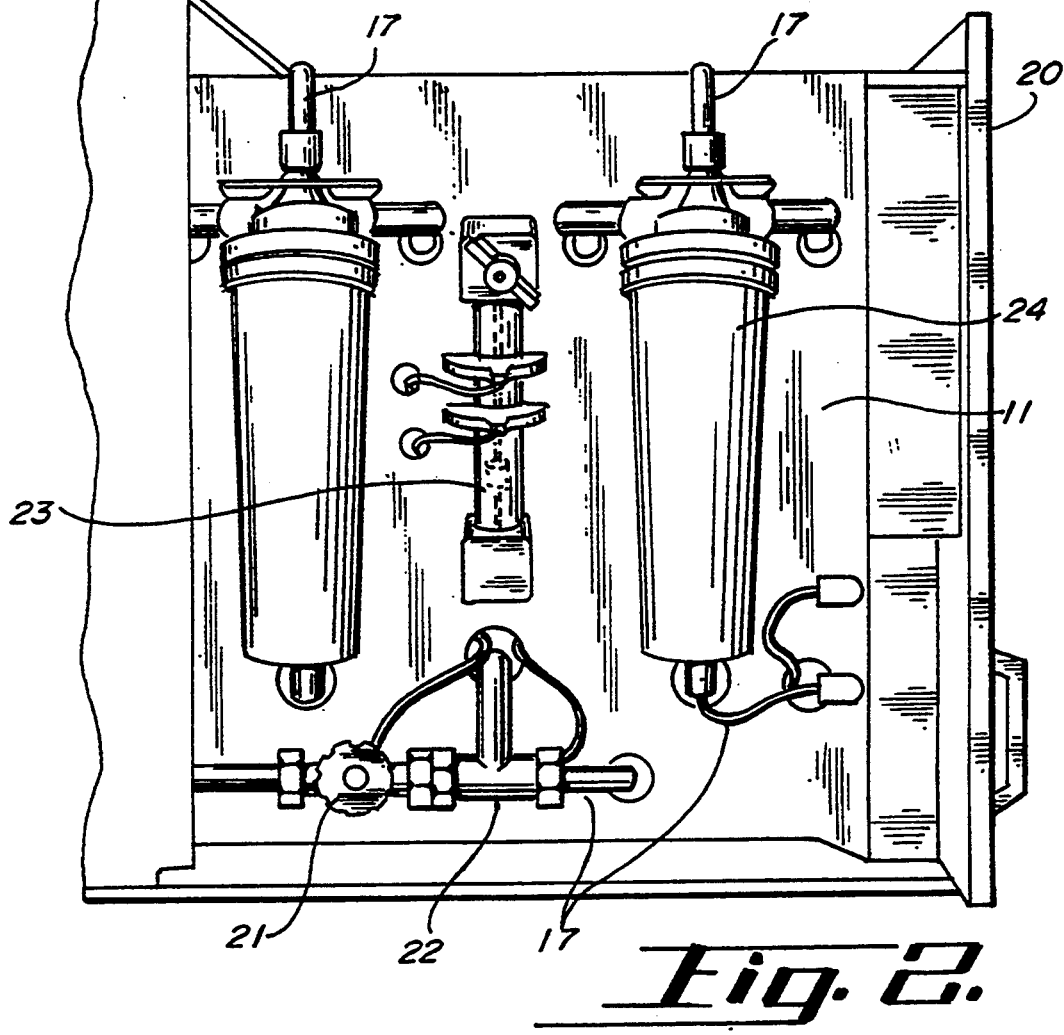
FIG. 2 is a perspective view of the inside of a slide-out drawer of the apparatus illustrated in FIG. 1 to illustrate in detail the possible sources of corrosive atmosphere environment, and also illustrating certain uses of the present invention.

The solution console 14 has various devices controlling and related to the flow of the chemicals being supplied to the process console 13, and such devices are carried on a pull-out drawer 20 so that access for service can be readily had to all of the devices. In FIG. 2, the drawer is illustrated, together with a number of various devices related to the flow of chemicals, including valves 21, T-fittings 22, tubings 17, a flow meter 23, and solution filters 24. In many installations, the numbers of tubings and valves and fittings are multiplied many times from the illustration of FIG. 2, but it is emphasized that the interior of the solution console 14 contains a corrosive atmosphere environment 11.

FIG. 1 also illustrates a compartment 25 beneath the floor 26 through which supply tubes or pipes 27 extend for supplying liquid chemical to various processing equipment 10. The tubes 27 are generally confined in protective ducts 28 and junction boxes or housings 29 between several ducts 28 wherein T-fittings and various related fittings of tubes 27 are confined for joining lengths of the tubing or pipe 27 together. The space 25 below the floor 26 comprises a corrosive atmosphere environment 11, and certainly the interior 29.1 of the junction box 29 also comprises a corrosive atmosphere environment 11.

Figure 4:
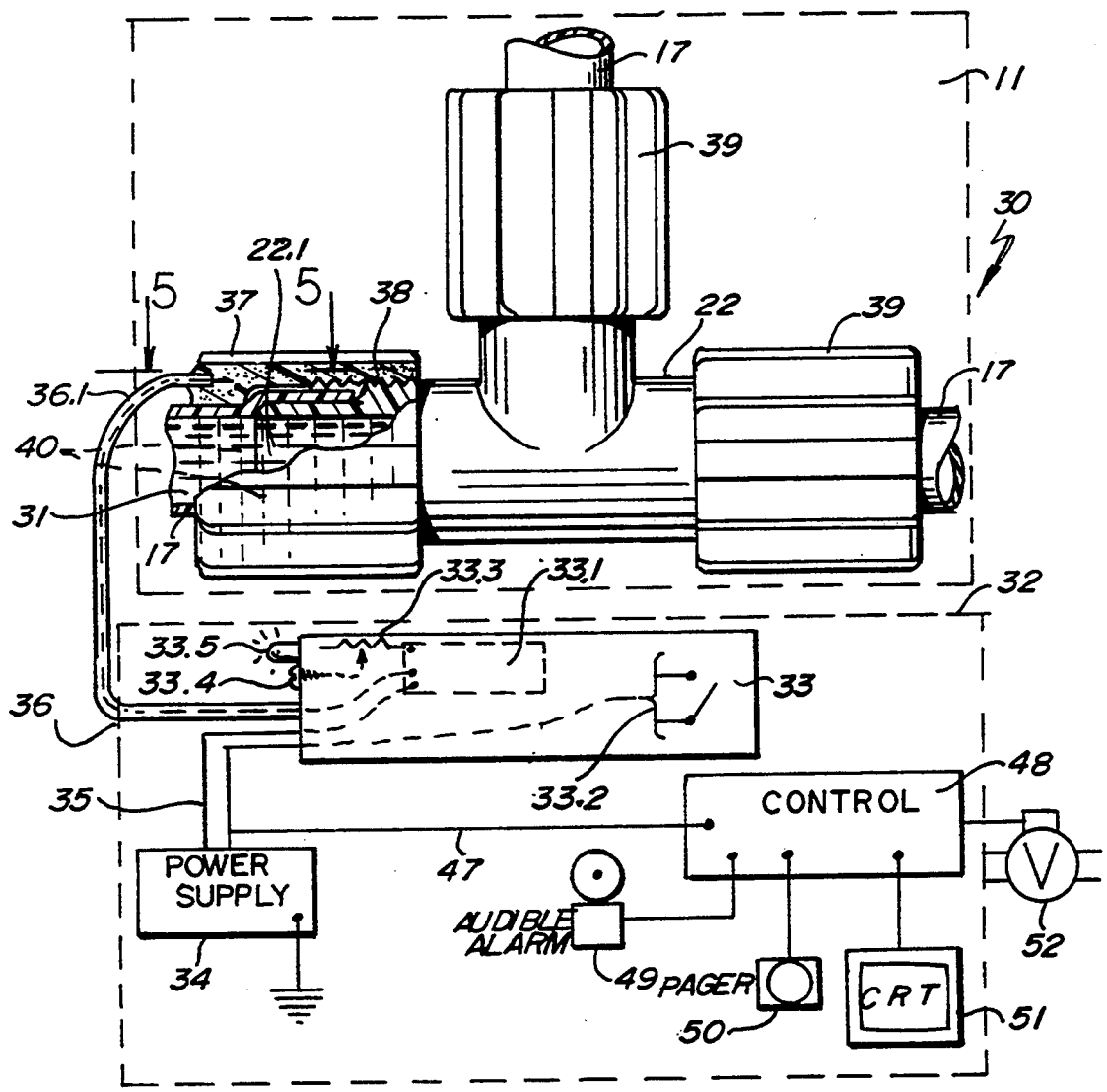
FIG. 4 is an enlarged elevation view of a T-fitting for chemical supply tubes, a portion of the fitting being broken away and shown in detail section, and also illustrating diagrammatically the monitoring apparatus of the present invention.

With particular reference to FIG. 4, a monitoring device indicated in general by the numeral 30 incorporates the fitting 22 for the purpose of determining the presence or absence of the liquid 31, also known as the target media, in the open interior 22.1, also known as the target zone, of the fitting 22. The liquid 31 may be any of a great number of chemicals being supplied to process equipment. When the liquid 31 is absent or not present in the open interior or target zone 22.1, the open interior 22.1 will be occupied by a gas, in many cases air, but in certain instances an inert gas such as nitrogen may occupy the open interior 22.1. Such gas as may be present in the open interior 22.1 when the liquid 31 is absent may be known as the ambient media. Such ambient media has electrical characteristics sufficiently different than the electrical characteristics of the liquid 31 so that the differences may be distinguishable. As illustrated, it is the fitting body 38 and the tubing 17 which creates the open interior or target zone 22.1 in which the liquid or target media 31 is confined.

A principal component of the monitoring device 30 is a voltage supply and current sensing circuit means indicated in general by the dashed line 32 which preferably exists outside of the corrosive atmosphere environment 11 and which comprises a capacitance proximity switch or current sensing device 33 of the type manufactured and sold by Gordon Products, Inc. of Brookfield, Conn. and preferably, Model PC 131/132. The circuit means 32 includes a power supply 34 which supplies electrical power to the switch 33 through a multiple conductor cable 35. The same type of proximity switch or current sensing device 33 is used with all the various embodiments of the invention disclosed herein.

The capacitance proximity switch 33 is also connected by a connection means 36 comprising a coaxial cable to a sensing element 37 which, in this device, comprises a functional part of the fitting 22 and more specifically, comprises a nut useful in clamping the end of the tubing 17 onto the body portion 38 of the fitting. It will be recognized that the fitting 22 comprises an operational means functioning relative to the target media liquid 31 in the sense that the body portion 38 of the fitting 22 provides a flow channel or guiding means for the liquid 31, and the fitting 22 connects the various lengths of tubing 17 together for the purpose of delivering the liquid as is intended. The fitting 22 is entirely formed of a plastic which is resistant to the deteriorating effects of the corrosive atmosphere environment 11 and also resistant to the liquid 31 which may be a strong acid, or base, or one of the other chemicals heretofore mentioned, or other chemical, that may be handled. Typical of the materials used in the fitting 22 and the tubes 17 is a fluoropolymer plastic known as perfluoroalkoxy, or by its trademark Teflon ® PFA. The nuts 39 on the fitting 22 are formed of similar material, as is the tubing 17 to which the fitting 22 is connected.

The functional sensing element or nut 37 is formed of a conductive plastic comprising a carbon filled plastic, or a plastic to which iron particles are added. The conductive nature of the plastic sensing element or nut 37 is extremely important. The sensing element or nut 37 may be molded of any of a number of different plastics which have been rendered conductive, and it is essential that the plastic in the sensing element or nut 37 be resistant to the deteriorating effects of the corrosive atmosphere environment 11. A preferable plastic in sensing element 37 is polyvinylidine fluoride (PVDF). Otherwise, the material may consist of polyetheretherketone (PEEK), or perfluoroalkoxy (PFA, Teflon®). Certainly, other suitable plastics are known to persons of skill in the art.

A conductive plastic as used in the sensing element or nut 37 is defined by the ELECTRONIC INDUSTRY ASSOCIATION Standard No. 541, as a material having a surface resistivity not exceeding $10^5$ ohms per square and volume resistivity not exceeding $10^5$ ohm-cm as tested by ASTMD 257. Such a conductive plastic is suitable as the conductive plastic elements or sensor elements in all of the examples given in this disclosure. The ELECTRONIC INDUSTRY ASSOCIATION also defines a carbon filled plastic as static dissipative where the range of surface resistivity is in the range of $10^5$ to $10^{12}$ ohms per square, and the volume resistivity is in the range of $10^5$ to $10^{12}$ ohm-cm. Plastics which are on the low end of these ranges may also be useful in the conductive plastic sensing element 37.

The dual purpose conductive plastic sensing element or nut 37, when charged with voltage from the switch 33, creates a sensing field or electrostatic field 40 which passes into and embraces the target media or liquid 31.

It will be recognized that whereas the voltage supply and capacitance sensing circuit means 32 is disposed out of the corrosive atmosphere environment 11, an end portion 36.1 of the coaxial cable 36 extends into and through portions of the corrosive atmosphere environment 11 and is connected in electrical current conducting relation to the conductive plastic sensing element or nut 37. The connection between the end of the coaxial cable 36 and the conductive plastic in the sensing element or nut 37 is in hermetically sealing relation and may be accomplished by insert molding during the forming of nut 37, so as to create a hermetic seal between the cable and the conductive plastic of the nut 37.

Figure 5:
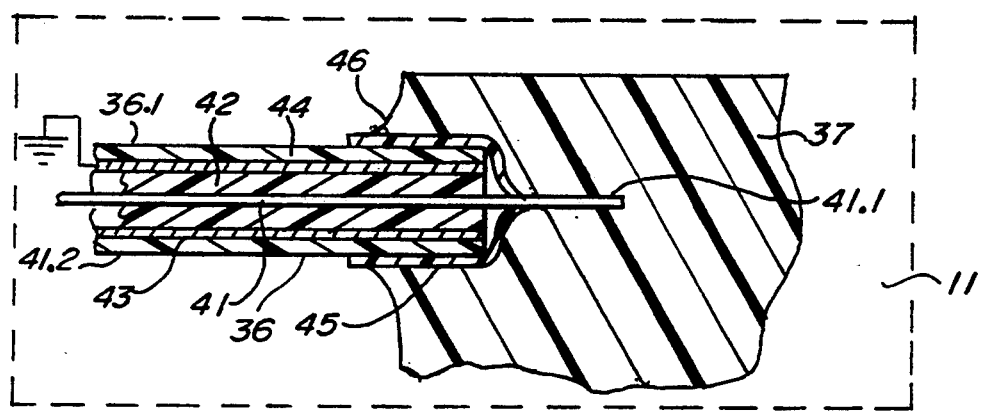
FIG. 5 is an enlarged detail section view illustrating the connecting wire hermetically sealed into a conductive plastic field element.

As seen in detail in FIG. 5, the cable 36 and its end portion 36.1 has an inner conductor or wire portion 41, the end portion 41.1 of which is embedded in and in engagement with the conductive plastic of the sensing element or nut 37. The wire 41 is surrounded by a flexible tubular plastic protective means 41.2 which isolates the wire 41 from the corrosive atmosphere environment 11, and includes insulation 42. A grounded metal sheath conductor 43 surrounds the insulation 42 to provide shielding for the wire 41. The tubular protective means 41.2 of cable 36 and its end portion 36.1 includes a tubular and flexible outer jacket 44 formed of a plastic which is resistant to the deteriorating effect of the corrosive atmosphere environment 11 and preferably the jacket 44 is formed of a fluoropolymer such as perfluoroalkoxy (Teflon® PFA). The tubular protective means 41.2 also includes a plastic tubing or end portion 45 sealingly applied by heat shrinking onto the end of the cable 36 and which is embedded in the conductive plastic of nut 37 so as to tightly embrace the end portion 41.1 of the wire and insulate the metal sheath 43 from the conductive plastic of the sensing element or nut 37. The heat shrinking of tubing 45 also seals the tubing 45 onto jacket 44. The tubing 45 is also formed of a plastic which is resistant to the deteriorating effect of the corrosive atmosphere environment, and is preferably formed of a fluoropolymer plastic known as perfluoroalkoxy (Teflon® PFA). It is important that the plastics in the jacket 44 and tubing 45 be selected as to have a melt temperature higher than the melt temperature of the conductive plastic of the sensing element or nut 37 as to maintain the integrity of the jacket 44 and tubing 45 during the insert molding of the nut 37.

It will be recognized that a hermetic sealing occurs at 46 between the conductive plastic of the sensing element or nut 37 and the end portion of the cable 36.1 and more specifically, the tubing 45. Accordingly, the end portion 36.1 of the cable 36 which extends through the corrosive atmosphere environment protects the wire 41 from the corrosive atmosphere therein and forms a positive connection to the conductive plastic of the sensing element or nut 37. The same type of coaxial cable 36 with the protective means 41.2 is used in all of the various embodiments of the invention herein disclosed.

Further with respect to FIG. 4 and the capacitance proximity switch 33, control circuitry 33.1 transmits the voltage from the power supply to the wire 41 and into the conductive plastic of the sensing element or nut 37 and senses the capacitance of the target liquid 31. A switching device 33.2, which may be electronic, provides the output of the switch 33 in order to provide an indication of the capacitance that has been sensed and the presence or absence of the target liquid 31. The output from the switch 33.2 is connected through the multiple conductor cable 35 and through the conductor 47 to a control apparatus 48, also out of the corrosive atmosphere environment 11. The switch 33 also has a sensitivity control 33.3 adjusted by an external screw 33.4 so that the desired range of sensitivity can be achieved. An indicator light 33.5 is provided to indicate the operation of the switch in adjusting the sensitivity.

The conductor 47 provides an indication to the control 48, the output signal of which may operate an audible alarm 49 or a paging device 50, or a CTR screen 51 to provide an indication to an operator or may operate a valve 52 related to the control system for the target liquid.

Figure 6:
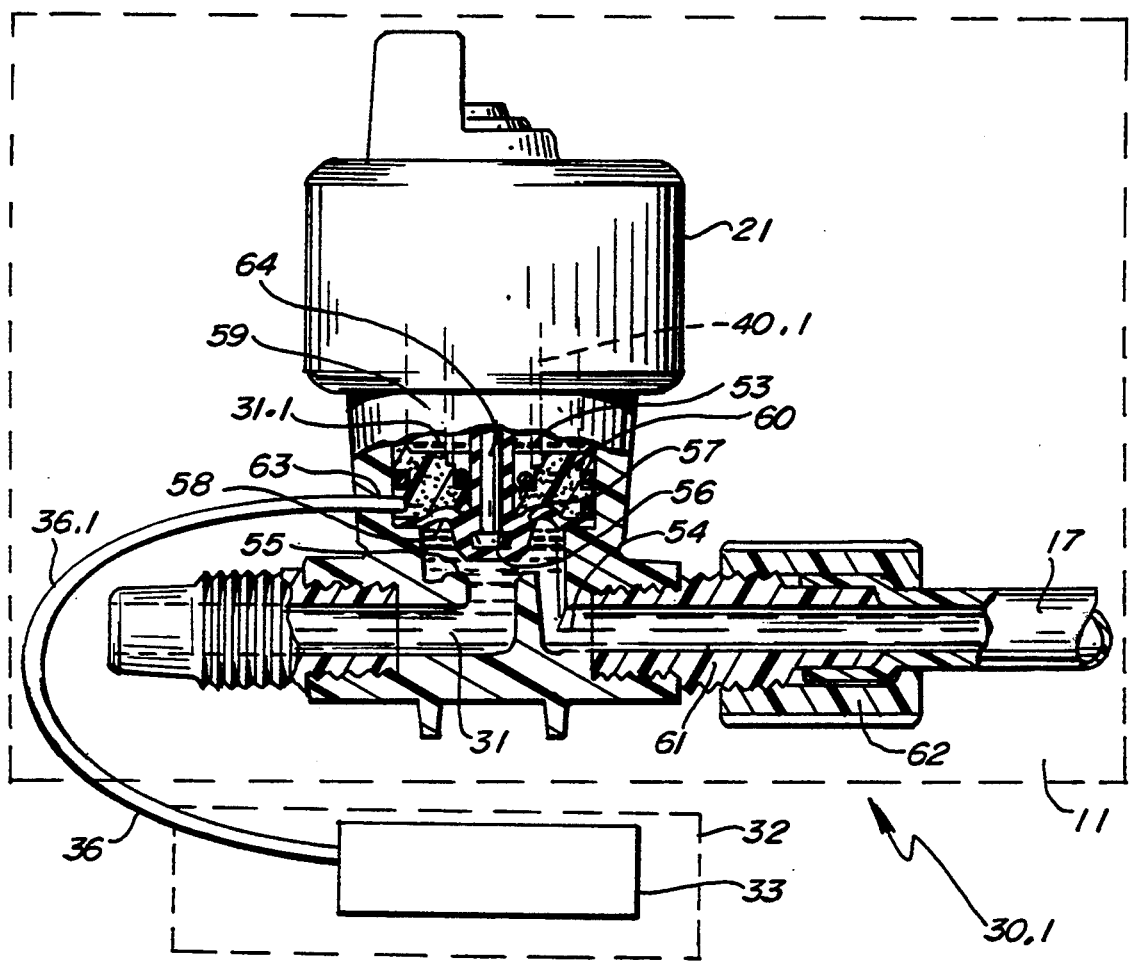
FIG. 6 illustrates a modified form of the invention and illustrates a valve incorporating the present invention therein.

In the form illustrated in FIG. 6, the valve 21 comprises an operational apparatus having function directly related to the target media, and in this case, the target media is leakage target liquid 31.1 when found in the open spaces 53 within the valve body. Such spaces 53 comprise a target zone which is normally vacant and devoid of any liquid. The open interior or spaces 53 are ordinarily filled with air or other gas such as nitrogen which may be known as the ambient media, which may be readily distinguished from the leakage liquid or target media 31.1. The spaces 53 also may be referred to as leakage courses because in the event of rupture or other leakage of diaphragm 57, the liquid 31 leaking from the normal flow course 54 will occupy a portion of the spaces or target zone 53. The normal flow course 54 in which the valve seat 55 exists and is alternately opened and closed for the valved liquid 31 by a valve element 56 which is part of the valve diaphragm 57, the peripheral portions of which are clamped between a shoulder 58 forming a part of the confining means or valve body 59 and a plastic retainer ring 60 which is made of conductive plastic and also serves the function of the sensing element of the capacitant proximity monitoring device 30.1, and generates a sensing field 40.1 in the spaces or target zone 53 to embrace the leakage liquid or target media 31.1, if present. The retainer ring or sensing element 60 comprises a functional part of the valve 21 and is in close proximity with the target zone or leakage spaces 53. Sensing element 60 is made of conductive plastic which is resistant to the deteriorating effects of the corrosive atmosphere environment 11 and also resistant to the deteriorating effects of leakage liquid 31.1, as described in regard to nut 37 of FIGS. 4 and 5. The valve 21 has conventional fittings 61 and clamping nut 62 for securing a length of tubing 17 to the valve, through which the liquid 31 is supplied.

The voltage supply and capacitance sensing circuit means 32 is the same as that illustrated in FIG. 4 and is connected by a coaxial cable 36, the end portion 36.1 of which extends through the corrosive atmosphere environment and through a suitable aperture 63 in the valve body so that the end portion 38.1 is connected into the conductive plastic field element-retainer ring 60 in the same manner as illustrated and described in connection with FIG. 5. The capacitance proximity switch 33 of the circuit means 32 is adjusted to respond to the change in capacitance which occurs when the target media or leakage liquid 31.1 exists in the target zone or leakage course 53 due to such a cause as rupture of the diaphragm 58 or other similar failure. Of course, the indication produced by the voltage supply and capacitance sensing circuit means 32 will cause operation of an alarm, paging device, or other functional device as described and illustrated in connection with FIG. 4.

The valve body 59, as well as the diaphragm 58, are made of plastic, such as perfluoroalkoxy (Teflon® PFA) which is resistant to the deteriorating effects of the corrosive atmosphere environment 11 and also of the liquid 31 flowing in the valve. The valve 21 may be manually operated or may be pneumatically operated as to move the operating stem 64 which is connected operationally to the diaphragm 58.

Figure 15:
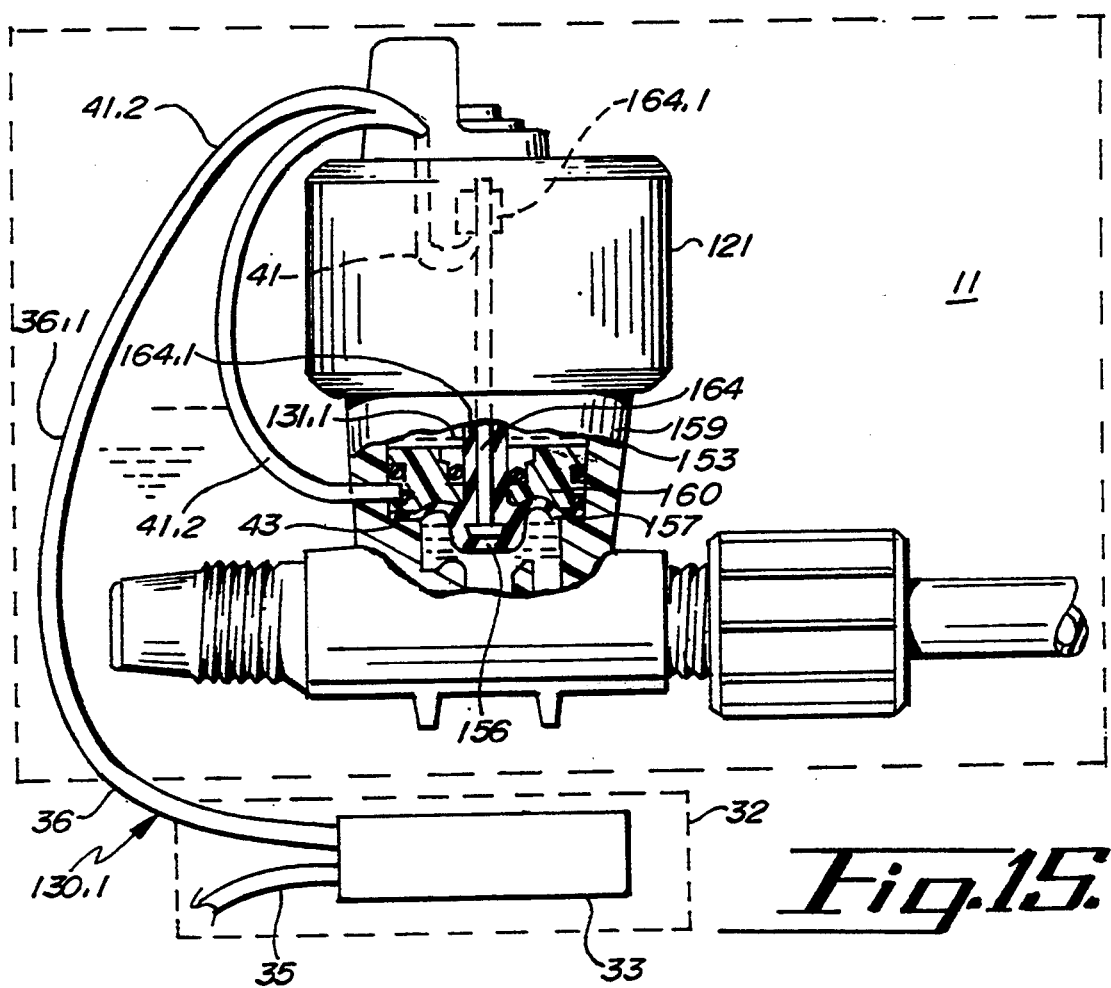
FIG. 15 illustrates a modified form of the invention as applied to a valve.

A monitoring device 130.1 as seen in FIG. 15 incorporates a valve 121 similar to valve 21 of FIG. 6, but with certain differences as noted. The valve body or confining means 159 exists within a corrosive atmosphere environment 11 and defines an open interior or spaces 153 which comprise the target zone in which the leakage liquid or target media 153 collects in the event of damage or rupture to the valve diaphragm 157. When the leakage liquid 131 is not present in the interior spaces or target zone 153, the spaces 153 are filled with air or other gas comprising the ambient media. A retainer ring 160 inside the valve body 159 holds the diaphragm 157 in place and also serves as a electrically conductive sensing element as a part of the monitoring device 130.1. The retaining ring 160 is made of electrically conductive plastic resistant to the deteriorating effects of the corrosive atmosphere environment and of the liquids that may engage the ring or sensing element 160. A second electrically conductive sensing element 164 comprises a valve stem operating the valve element 156 of the diaphragm 157; and the valve stem will be operated by a pneumatic piston in the valve body in a manner well known to persons of skill in the art. The valve stem 164 may be made of metal or of conductive plastic, and is separated from the open interior spaces 153 of the valve body by a tubular protective wall 164.1 formed of the same plastic of which the diaphragm 157 is formed and integrally thereof as to be resistant to the deteriorating effects of liquids flowing through the valve.

The voltage supply and sensing circuit means 32 is the same as that illustrated in connection with FIG. 4 and the proximity switch or sensing device 33 is connected by a coaxial cable 36 to the electrically conductive sensing elements 160 and 164. The end portion 36.1 of the coaxial cable extends through the corrosive atmosphere environment 11 to the valve body 159 and the protective means 41.2 of the cable hermetically seals both the wire portion 41 and the grounded shield conductor portion 43. In this embodiment of the invention, the wire portion 41 of the coaxial cable is connected by a clamping device 164.1 to the valve stem 164. The grounded shield conductor portion 43 is connected into the conductive plastic sealing element or retainer ring 160. The voltage supply and sensing circuit means 32 establishes a sensing field between the two electrically conductive sensing elements 160, 164 and in the target zone 153. When the leakage liquid or target media 131.1 replaces the ambient media in the target zone 153, the difference in electrical characteristics of the leakage liquid as compared to those characteristics of the ambient media, cause a change in the current which is sensed by the sensing device or switch 33 so as to produce an indication through the output cable 35 in the manner described in connection with FIG. 4. Because the monitoring device 130.1 utilizes two separate conductive sensing elements 160, 164, which create a sensing field in the target zone 153, the sensing field, as created, is considerably more intense than the field created in the form illustrated in FIG. 6 so that the change in the current sensed by the switch or sensing device 30 is considerably greater, in the range of six to eight times greater, so that a positive reading can be obtained which indicates the presence of the target media or leakage liquid 131.1.

It has been found that by connecting the conductive plastic sensing element or retainer ring 160 to the grounded shield conductor portion 43, the effect of outside influences, such as touching the valve housing 159 with a person's hand, does not affect the operation of the monitoring device, and the likelihood of false readings or indications is minimized.

Figure 16:
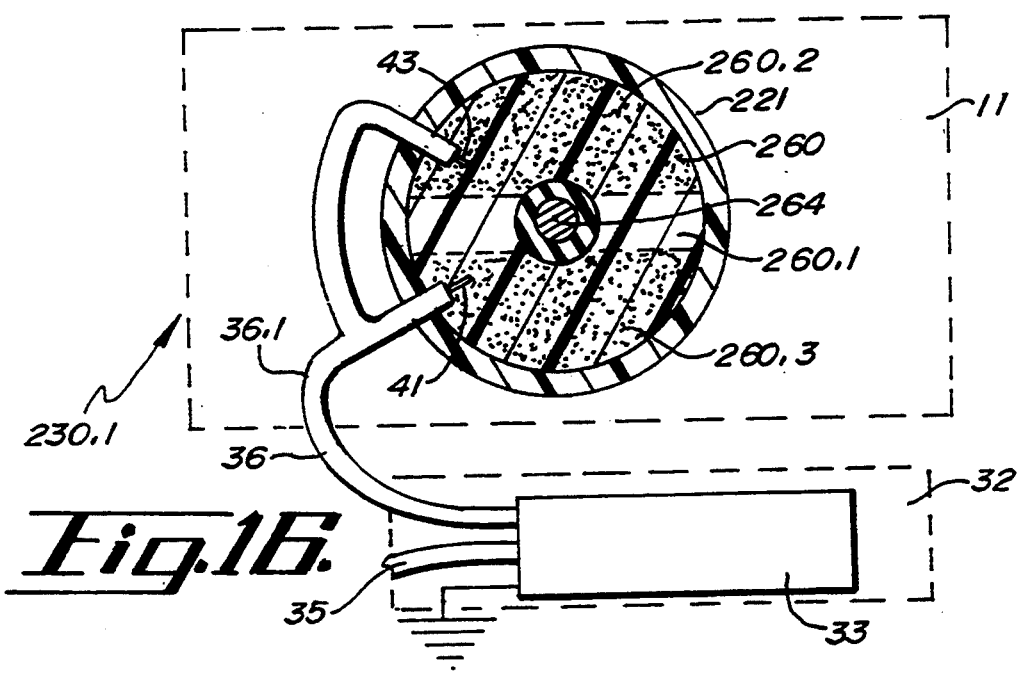
FIG. 16 is a detail section view of a modified form of the invention as applied to the valve of FIG. 15.

In the form of the invention illustrated in FIG. 16, the valve 221 is substantially like that illustrated in FIG. 15 with certain exceptions as noted. The valve 221 is confined in a corrosive atmosphere environment 11 and in this form, the valve stem 264 is not connected to the circuit means 32 as in FIG. 15. The retainer ring 260 which serves to retain the diaphragm of the valve in place, is molded with an electrically insulating plastic spacer portion 260.1 molded integrally of and in one piece with a pair of conductive plastic portions 260.2, 260.3 which define the two conductive plastic sensing elements of the monitoring devicel 230.1. The spacer portion 260.1 and the conductive portions 260.2, 260.3 are all formed of plastic which is resistant to the deteriorating effects of the corrosive atmosphere environment and of the liquid that may be encountered in the valve. As illustrated, the coaxial cable has its inner end portion 36.1 hermetically sealed to both of the sensing elements 260.1, 260.2, and the wire portion 41 is connected to the sensing element 260.3 while the grounded shield conductor portion 43 is connected to the sensing element portion 260.2. The leakage liquid, when present within the valve housing and forming the target media, will replace a portion of the ambient media or air and will span between and engage both of the conductive plastic sensing elements 260.2, 260.3, and in most cases provide a current path between the elements 260.2, 260.3, thus causing a change in the current at the switch or sensing device 33 so as to produce an indication of the presence of the leakage liquid or target media as described in connection with FIG. 15.

Figure 7:
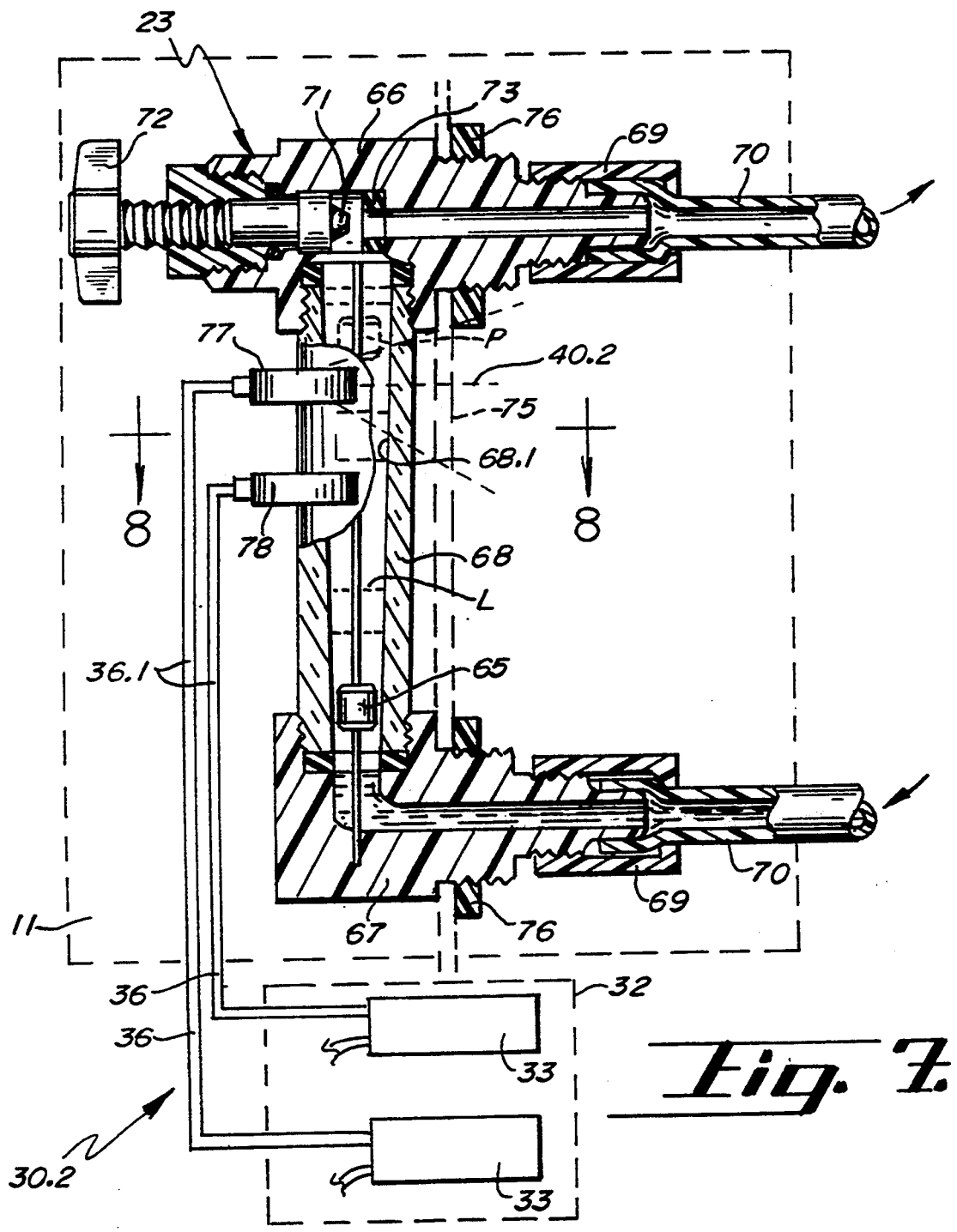
FIG. 7 illustrates another modified form of the invention and illustrates a liquid flow meter incorporating the present invention.
Figure 8:
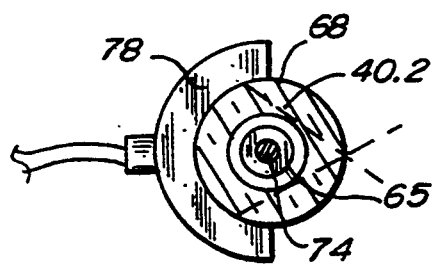
FIG. 8 is a detail section view taken approximately at 8—8 of FIG. 7.

In the form of the invention illustrated in FIGS. 7 and 8, the monitoring device 30.2 incorporates a flow meter 23 comprising an operational means which is functional in relation to the target media, which in this case comprises a "float" or linear impelled element 65. The impelled element 65 is not a float in the usual sense, but appears to float upwardly when liquid L is flowing upwardly through the flow meter. The flow meter comprises upper and lower body portions 66, 67 with a confining means or transparent sight tube 68 extending therebetween. The interior 68.1 of the sight tube 68 comprises the target zone in which the float or target media 65 moves. The liquid L comprises the ambient media which is displaced by the float or target media 65. The body portions are connected by clamping nuts 69 to the adjacent tubes 70 which carry the liquid L into and from the flow meter. A needle valve 71 is movable by a hand operated handle 72 onto a valve seat 73 to regulate the flow of liquid through the flow meter. The float or impelled element 65 slides upwardly and downwardly in the sight tube on guide means comprising a rigid rod 74. All of the parts of the flow meter are made of plastic, such as PVDF or PFA, which is resistant to the deteriorating effects of chemicals in the liquid L and in the corrosive atmosphere environment 11. The body portions 66, 67 may be clamped to a mounting wall 75 by clamping nuts 76.

The monitoring device 30.2 includes a pair of conductive plastic sensing elements 77 and 78 which are affixed as by adhesive to the exterior surface of the sight tube 68 and in spaced relation with each other. A voltage supply and capacitance sensing circuit means 32 in this embodiment utilizes a pair of the capacitance proximity switches or sensing devices 33, each of which is connected by a respective coaxial cable 36 to a respective sensing element 77, 78. The circuit means 32, together with the sensing elements 77, 78, which are formed of conductive plastic resistant to the deteriorating effects of the corrosive atmosphere environment and of the same materials as was indicated to be used in the sensing element or nut 37 of FIG. 4, create a sensing field 40.2 which embraces adjacent spaces or target zone 68.1 and the float or target media 65 when nearby. Again, the end portions 36.1 of each of the cables 36 in FIG. 7 extend into and through the corrosive atmosphere environment for connection to the field elements 77, 78 and the end portions 36.1 of both of the cables are connected into the conductive plastic field elements 77, 78 in the same identical manner illustrated and described in connection with FIG. 5.

As illustrated in FIG. 7, the impelled element or target media 65 will, in response to certain flows of liquid through the flow meter 23, be raised up in the target zone 68.1 to the dotted line position P thereof adjacent the conductive plastic sensing element 77. This position P of the impelled element 65 defines a sensing station in the target zone at which the presence or absence of the float 65 is to be determined in order to indicate a substantial desired flow through the flow meter. At lesser flows, the impelled element 65 may only achieve a position adjacent the conductive plastic field element 78, which defines an alternate sensing station. The capacitive sensing means will produce indications of the flow determined by the position of the impelled element 65.

Figure 17:
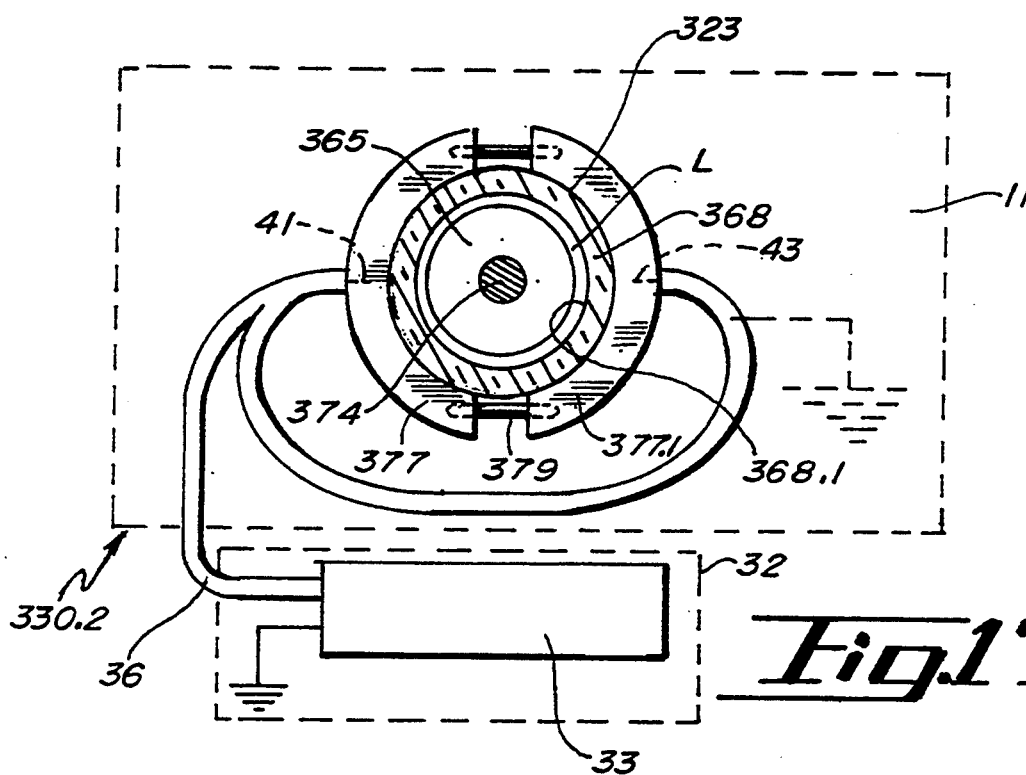
FIG. 17 illustrates a modified form of the invention as applied to a liquid flow meter.

An alternate embodiment of the monitoring device is illustrated in FIG. 17 and is indicated by the numeral 330.2, and incorporates a flow meter 323 like the flow meter of FIG. 7 with certain exceptions noted. The flow meter 323 has a sight tube or confining means 368 with an open interior 368.1 defining a target zone confining the liquid L which comprises the ambient media of this monitoring device. A float or impelled element 365 comprises the target media, the presence of which is to be determined. The target element 365 is guided along a guide rod 374 as the target media or float 365 moves upwardly and downwardly in the sight tube. The monitoring device 330.2 has a pair of substantially identical conductive plastic sensing elements 377 and 377.1 which are formed of a suitable plastic as previously described, which is resistant to the deteriorating effects of the corrosive atmosphere environment 11 in which the flow meter exists. Connector pins 379 of insulating material connect the sensing elements 377, 377.1 together for retaining the sensing elements in predetermined position with respect to the sight tube 368.

Figure 14:
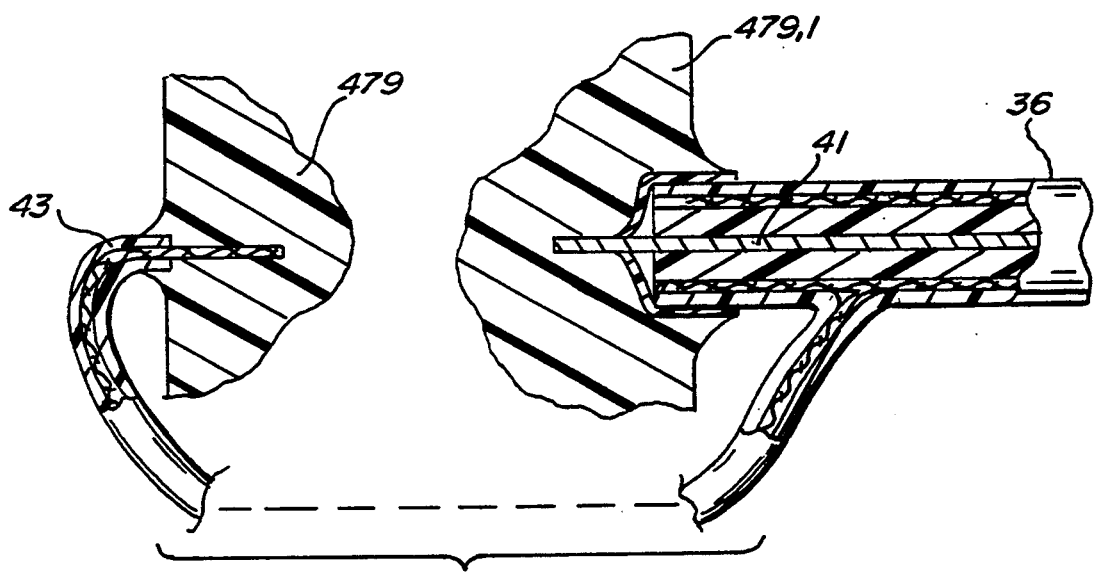
FIG. 14 is an enlarged detail section view illustrating portions of the electrical connections illustrated in FIG. 12.

The voltage supply and current sensing means 32 is connected by the connection means or coaxial cable 36 to the sensing elements 377, 377.1 in the same manner as illustrated in FIG. 14. The wire portion 41 is connected into the conductive plastic sensing element 377 in hermetically sealed relation; and the grounded shield conductor portion 43 is connected into the conductive plastic sensing element 377.1. The two conductive plastic sensing elements 377, 377.1 create a sensing field through the sight tube and target zone 368.1 as to produce a change in the current sensed by the capacitive proximity switch or sensing device 33 as to produce an indication when the target media or float 365 moves into confronting relation with the sensing elements.

Figure 3:
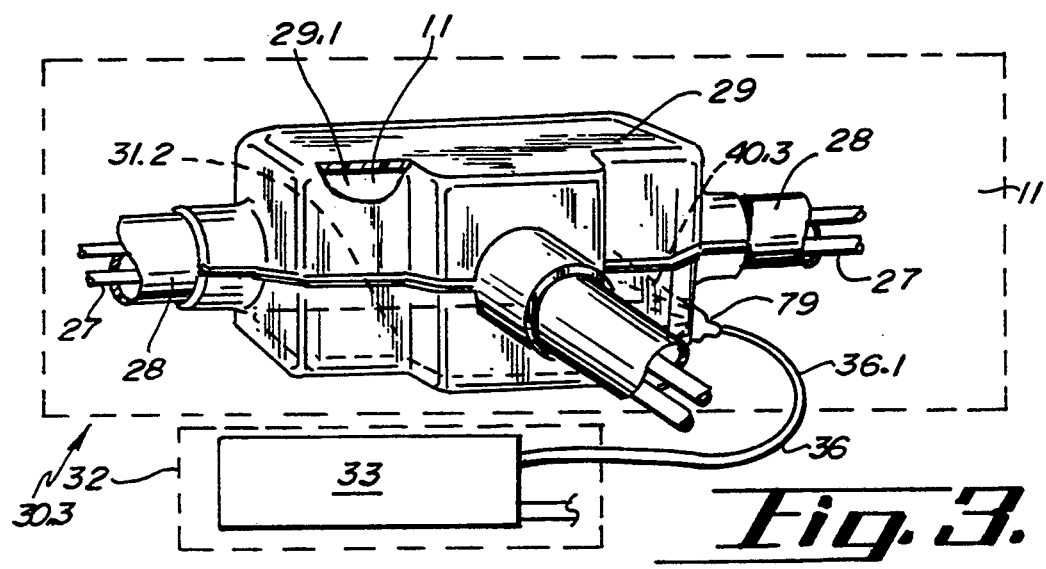
FIG. 3 is an enlarged perspective view of subfloor chemical supply tubes and protective ducts therefor and a junction box enclosing certain fittings for the chemical supply tubes.

With reference to FIG. 3, the monitoring device 30.3 comprises the electrically insulating plastic junction box or confining means 29 and the protective ducts 28, which function to temporarily store small quantities, if any, of a leakage liquid or target media 31.2, which may be collected in the open interior or target zone 29.1 of the junction box 29 and creates a sensing field 40.3 to embrace the leakage liquid or target media 31.2. The pool of leakage liquid or target media 31.2 in this form replaces a portion of the ambient media or gas or air in the interior of the junction box. The conductive plastic sensing element 79, resistant to the deteriorating effects of corrosive atmosphere environment, is affixed as by adhesive to the exterior surface of the plastic junction box 29. As described previously, the voltage supply and capacitance sensing circuit means 32 incorporates the capacitance proximity switch 33 which is connected by a coaxial cable 36 to the sensing element 79 and the end portion 36.1 of the coaxial cable extends into and through portions of the corrosive atmosphere environment and is attached to and embedded in portions of the conductive plastic field element 79 in the manner illustrated and described in connection with FIG. 5. A sensing field extends from the sensing element 79 and into the target zone 29.1 and when the leakage liquid or target media 31.2 is sensed, a change of current is sensed in the proximity switch to produce an indication of the change.

An alternate embodiment 430 of the monitoring device is illustrated in FIGS. 11–14. The junction box or confining means 429 exists in the corrosive atmosphere environment, and the interior 429.1 of the box also contains the corrosive atmosphere and comprises the target zone in which quantities of leakage liquid or target media 431.2 may collect and replace a portion of the ambient media or air. The walls 429.1 of the box 429 are formed of plastic which is an electrical insulator, and also resistant to the deteriorating effects of the corrosive atmosphere. A pair of conductive plastic sensing elements 479, 479.1 are mounted on the sidewall 429.2 in spaced relation with each other, and are connected to the coaxial cable 36 in the manner illustrated in FIG. 14 whereby the wire portion 41 is connected into the sensing element 479.1 in hermetically sealed relation, substantially in the manner illustrated and previously described in connection with FIG. 5; and the grounded shield conductor portion 43 is connected into the conductive plastic sensing element 479 in hermetically sealed relation.

The circuit means 32 and the conductive plastic sensing elements 479, 479.1 create a sensing field 440.3 which extends partially into the interior or target zone 429.1 of the junction box to embrace the liquid or target media 431.2 therein, when present. When the target media or liquid 431.2 is present, the current in the proximity switch or sensing device 32 changes to produce an indication of the presence of the leakage liquid or target media 431.2 in the housing.

Figure 9:
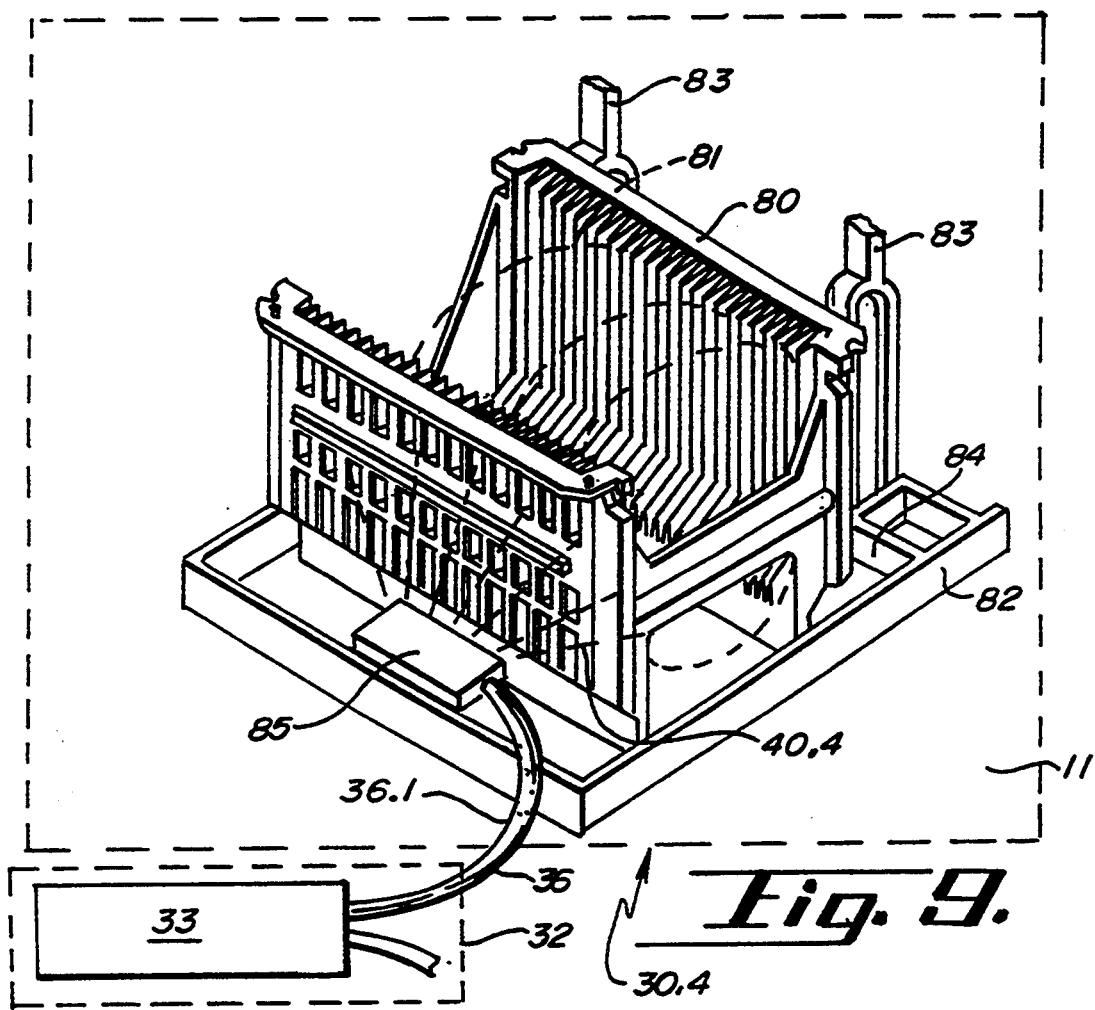
FIG. 9 is a perspective view of another modified form of the invention and illustrating a platform upon which a wafer carrier is supported and incorporating the present invention.

FIG. 9 illustrates another modified form 30.4 of the monitoring device wherein the target media comprises a wafer carrier 80 which is a rigid object, and in most instances, will be filled with a multiplicity of semiconductor wafers 81 arranged in slots between the ribs formed in the sidewalls of the wafer carrier. The wafer carrier may be formed of any of a number of plastics and in some instances, may be formed of fluoropolymer materials and in other instances, be formed of other plastics such as polypropylene, PVDF and other related plastics. The wafer carrier in this illustration will exist in a corrosive atmosphere environment 11 and is illustrated to be supported upon a confining means or platform 82 suspended from upright rods 83. The platform 82 defines a target zone with certain guide rails 84 against which portions of the wafer carrier 80 lie so as to be properly located on the platform. The guide rails 84 define a sensing station or target zone at which the presence or absence of the wafer carrier 80 is to be determined. The presence or absence of the wafer carrier 80 and wafers 81 is determined by the voltage supply and capacitance sensing circuit means 32 which is connected as in the other forms of the invention by a coaxial cable 36 which has a portion 36.1 extending through the corrosive atmosphere environment 11 and to a conductive plastic sensing element 85 creating a sensing field 40.4 which may also function as a guide for properly locating the base portion of the wafer carrier 80. Depending upon the closeness of fit of the guides 84 on the platform 82, the conductive plastic sensing element 85 may alternately be spaced from the wafer carrier so as to be nonfunctional with respect to the positioning of the wafer carrier on the platform. As in the other monitoring devices illustrated, the sensing element 85 creates an adjacent sensing field, and the circuit means 32 senses the capacitance adjacent the sensing element 85 to produce an indication of the presence or absence of the changeable target wafer carrier 80 and wafers 81. The sensing element 85 is formed of the same conductive plastic as described in connection with the sensing element or nut 37 of FIG. 4; and the end portion 36.1 of the coaxial cable is connected into the field element in the manner illustrated and described in connection with FIG. 5.

In the form of the monitoring device 30.5 illustrated in FIG. 10, the target media comprises the liquid 31.3, in the tank or container 15, the interior of which comprises a target zone to receive the liquid or target media 31.3. The electrically insulating plastic wall of the tank 15 carries a conductive plastic sensing element 86 which is formed of the same material as described in connection with the sensing element or nut 37 in FIG. 4. The voltage supply and capacitance sensing circuit means 32 are connected to the field element 86 by the cable 36, the end portion 36.1 of which extends into and through the corrosive atmosphere environment 11 and is affixed into the field element 86 in the manner illustrated and described in connection with FIG. 4. The sensing element 86 creates a sensing field 40.5 so that an indication is produced when the level of the target liquid 31.3 recedes below the level of the field element 86.

Figure 24:
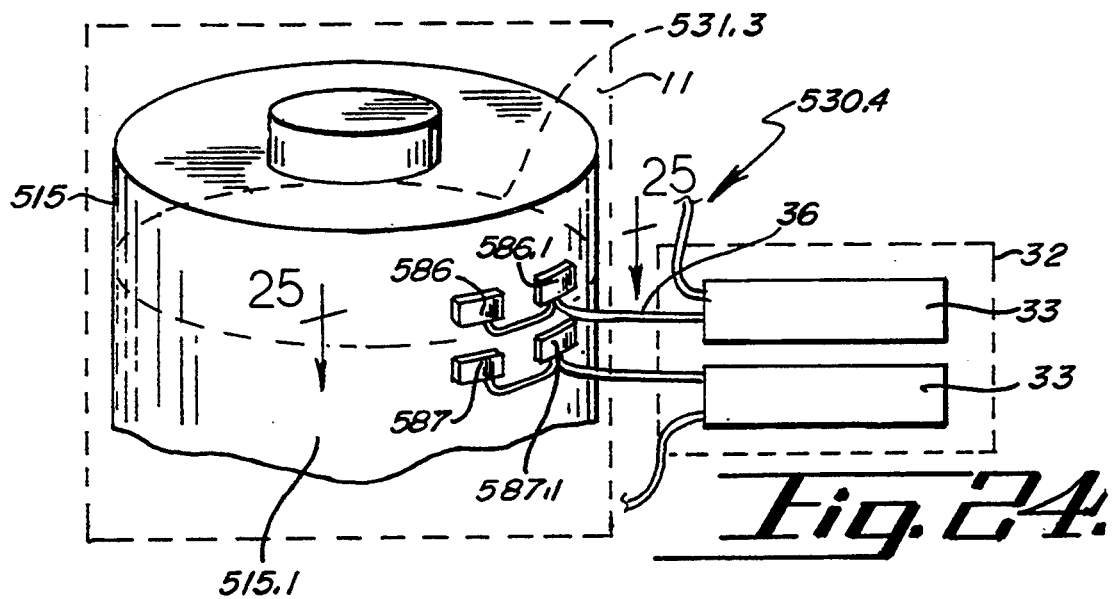
FIG. 24 is a detail perspective view of a modified form of the invention as applied to a supply drum or tank.
Figure 25:
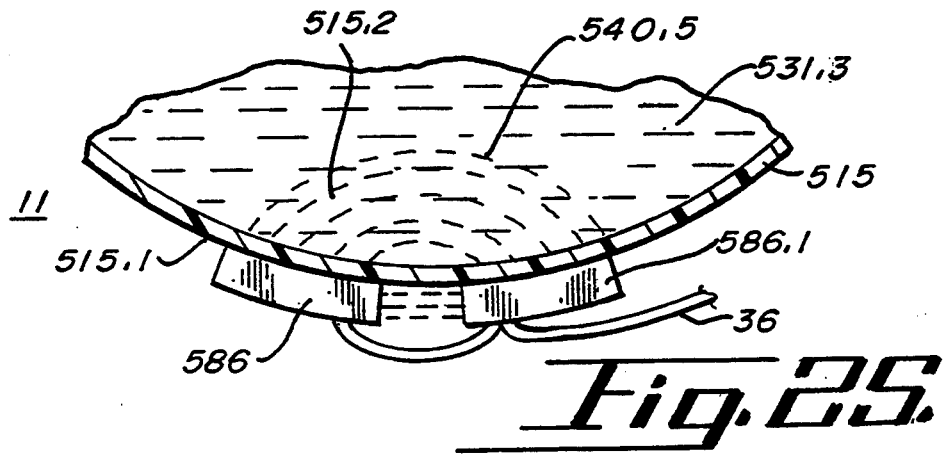
FIG. 25 is an enlarged detail section view taken approximately at 25—25 of FIG. 24.
Figure 26:
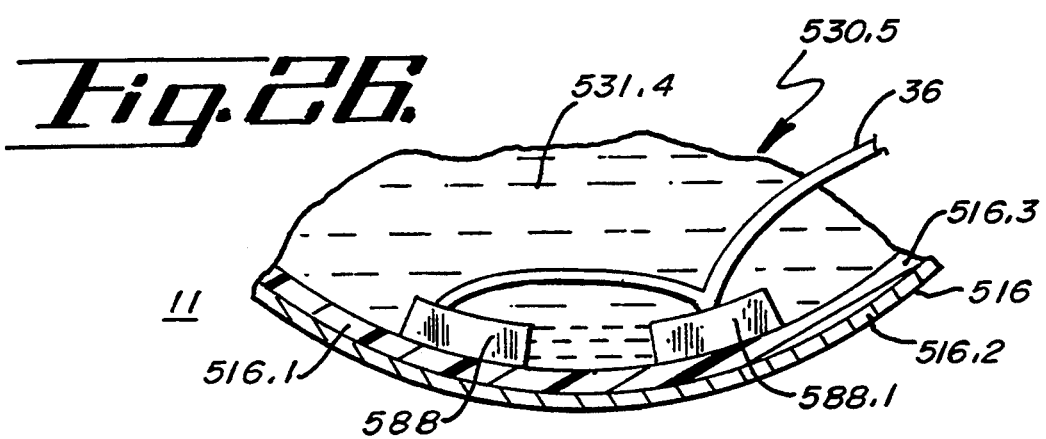
FIG. 26 is still another modified form of the invention comprising a variation on the form of the invention illustrated in FIGS. 24 and 25.

Another form of monitoring device 530.4 is illustrated in FIGS. 24, 25 and 26 wherein the drum or tank or confining means 515 for storing liquid 531.3 comprises the target media in this form of the invention. The open interior of the tank 515 comprises the target zone normally confining an ambient media or air. A first pair of conductive plastic sensing elements 586, 586.1 which are resistant to the deteriorating effects of the corrosive atmosphere environment 11 are mounted as by adhesive onto the outer side of the tank wall 515.1 adjacent the desired level of the liquid in the tank. The circuit means 32 are connected to the pair of sensing elements 586, 586.1 substantially in the manner illustrated in FIG. 14 and by means of the coaxial cable 36 as to produce a sensing field 540.5 within the open interior or target zone 515.2. When the level of the liquid or target media 531.3 in the target zone confronts the sensing elements 586, 586.1, a current change is sensed by the sensing device or proximity switch 33 to produce an indication of the level of the liquid in the tank.

A second pair of sensing elements 587, 587.1 are connected to a separate proximity switch or sensing device 33 to produce an indication of another level of the liquid in the tank.

In the additional form of the invention illustrated in FIG. 26, the sensing elements 588, 588.1 of conductive plastic and resistant to the deteriorating effects of the corrosive atmosphere and also of the liquid 531.4 in the tank 516, are adhered to the wall 516.1 of the tank which has a steel outer shell 516.2 and a plastic lining 516.3 which is resistant to the deteriorating effects of the liquids in the tank and of the corrosive atmosphere 11. The sensing elements 588, 588.1 are connected by a coaxial cable 36 to which they are hermetically sealed, and to a sensing circuit as previously described in connection with FIGS. 24 and 25.

Figure 18:
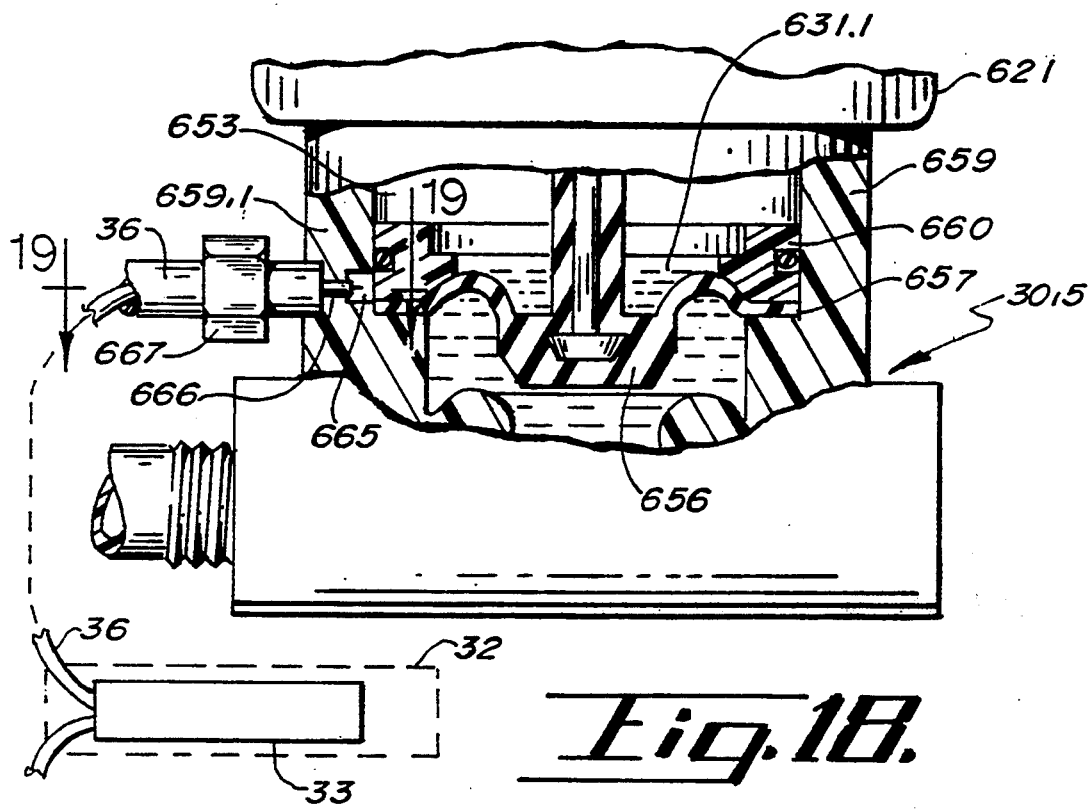
FIG. 18 is an enlarged detail section view of a valving apparatus and illustrating a modified form of the invention.
Figure 19:
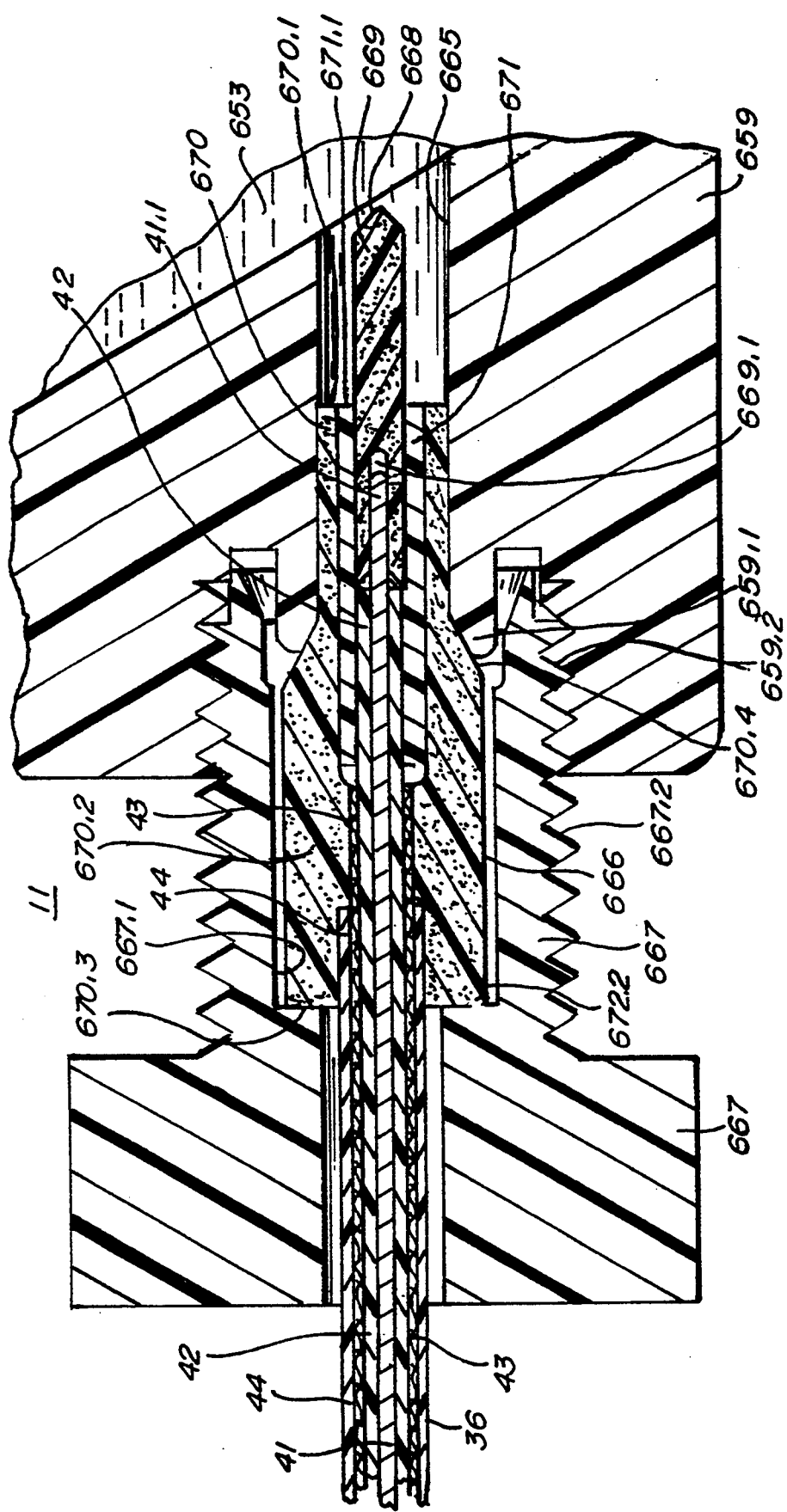
FIG. 19 is a greatly enlarged detail section view taken approximately at 19—19 of FIG. 18.

The monitoring device 30.5 illustrated in FIGS. 18 and 19 incorporates a valve 621 much like the valve 21 of FIG. 6. The valve 621 incorporates a diaphragm 657 with a valving element 656, a valve housing 659 having an open interior 653 in which leakage liquid 631.1 may collect in the event the diaphragm 657 is ruptured or is caused to leak in some way. The periphery of the diaphragm is retained in placed by a retainer ring 660. The open interior 653 comprises the target zone for the leakage liquid which is the target media in this embodiment. Ordinarily, the open interior or target zone 653 contains only air or gas as the ambient media, which has different electrical characteristics than the leakage liquid or target media 631.1 and accordingly, the presence of the leakage liquid or target media may be easily detected. The sidewall 659.1 of the valve housing has an access port 665 therethrough in order to provide access into the target zone or interior chamber 653, and to also mount and confine a sensing probe indicated in general by numeral 666. The sensing probe 666 is hermetically sealed onto the end of the coaxial cable 36 which provides the electrical connection to the circuit means 32 and to the capacitance proximity switch or sensing device 33.

The sensing probe is retained in the access opening 665 by a retainer fitting 667.

The tip portion 668 of the sensing probe 666 in the access port 665 extends into close proximity with the interior chamber 653 of the valve, substantially as illustrated in FIG. 19. The tip portion 668 of the sensing probe comprises a pair of elongate conductive plastic sensing elements 669 and 670, both of which are resistant to the deteriorating effects of the corrosive atmosphere environment 11 in which the valve 621 exists, and also to the deteriorating effect of strong chemicals, such as acids and bases, which may be encountered within the valve. The elongate sensing elements 669, 670 are concentric of each other and are spaced from each other by a cylindrical, concentric insulating plastic spacer 671 formed of a plastic which is highly resistant to the deteriorating effect of the corrosive atmosphere and of the chemicals which are encountered within the valve; and the spacer 671 is molded integrally and in one piece with both of the conductive plastic space sensing elements 669, 670. It will be recognized that the sensing element 669 has a rod-like shape and extends along the access port 665 beyond the ends 670.1, 671.1 of the sensing element 670 and the insulating spacer 671, respectively. The open space within part 665 surrounds the tip portion 668 of the probe and permits the leakage liquid to embrace and touch sensing elements 669, 670 and spacer 671. The sensing element 670 is tubular in shape and has an outer end portion 670.2 which is received within a cylindrical bore 667.1 of the threaded retainer 667. A shoulder surface 667.2 of the retainer 667 bears against the end surface 670.3 of the sensing element 670 to retain the entire probe 666 in the access port and with the tapered surface 670.4 of the sensing element 670 bearing against the annular seat 659.1 which surrounds the access port 665.

The conductive plastic sensing element 670 engages the grounded shield conductor portion 43 of the coaxial cable 36 in conducting relation, and is molded into the shield conductor portion 43 in a permanent relationship.

The conductive plastic sensing element 670 is also molded onto the end portion of the protective jacket 44 of the coaxial cable 36 in hermetically sealed relation.

The end portion 41.1 of the wire portion 41 of the coaxial cable extends into a bore 669.1 of the rod-like conductive plastic sensing element 669 and is in electrically conductive relation with the sensing element 669. The sensing 669 is preferably molded directly onto the end portion 41.1 of the wire portion 41. The end portion of the insulation 42 of the coaxial abuts the inner end of the rod-like conductive plastic sensing element 669.

It will be recognized that the threaded end portion 667.2 of the retainer 667 is threaded into the threads 659.2 of the valve body 659 adjacent the access port 665 and the retainer 667 may be readily demounted from the valve body by unthreading the inner end portion 667.2 from the threads 659.1, whereupon the sensing probe 666 may be entirely removed from the housing of the valve body 659 by simply pulling the sensing probe out of the valve body. This facilitates replacing the probe in the event it should become damaged or in need of service.

The monitoring device 30.6 illustrated in FIGS. 20–23 incorporates a valve 721 substantially similar to the valve 21 of FIG. 6. It will be seen that the valve 721 has a diaphragm 757 and a valve element 756 operating to open and close the valve to control the flow of liquid. The valve has a valve stem 764 moving upwardly and downwardly and reciprocating between open and closed position so as to operate the diaphragm and the valve element. The monitoring device 30.6 functions to determine and indicate the condition of the valve as to whether it is open or closed, i.e., whether the valve stem 764 is in its lower position wherein the valve is closed, or in its upper position wherein the valve is open. The valve housing or confining means 759 defines an open interior or target zone 753 confining two separate sensors, a lower sensor 760 and an upper sensor 762, which are identical to each other with the exception that the sensor 760 is in fixed position relative to the housing 759 and the sensor 761 is vertically adjustably mounted in the housing. The interior chamber 753 of the valve housing defines the target zones for the sensors, there being a lower target zone 753.1 for the lower sensor 760 and an upper target zone 753.2 for the upper sensor 761.

Both of the lower and upper sensors 760, 761 are identical with each other except as to position within the housing 759. Accordingly, an understanding of the upper sensor 761, illustrated in FIG. 23, suffices for an understanding of both of the sensors.

A probe 666, identical to the probe illustrated in FIG. 19, comprises a part of each of the lower and upper sensors 760, 761.

As in other forms of the invention, the coaxial cables 36 of each of the sensors 760, 761 are connected to circuit means 733 including capacitive proximity switches 33 to sense changes in current in the wire portion 41 and in the grounded shield conductor portion 43. In the form of the invention illustrated in FIGS. 21–23, the probes 666 are retained in the sensors 760, 761 by threaded retainer cups 762, the end surface 762.1 bearing against the end face 670.3 of the conductive plastic sensing element 670 which is an integral part of the probe 666.

In this form of the invention, the target media comprises a solid article or disk 763 which is made of conductive plastic resistant to the deteriorating effects of the corrosive atmosphere environment 11 in which the valve 721 exists. The disk is secured onto the end of the valve stem 764 to move with the valve element as the valve 721 is opened and closed. The disk or target media 763 is movable to and between the two dotted positions illustrated in FIG. 21 and designated by the letter O and C, respectively.

Figure 22:
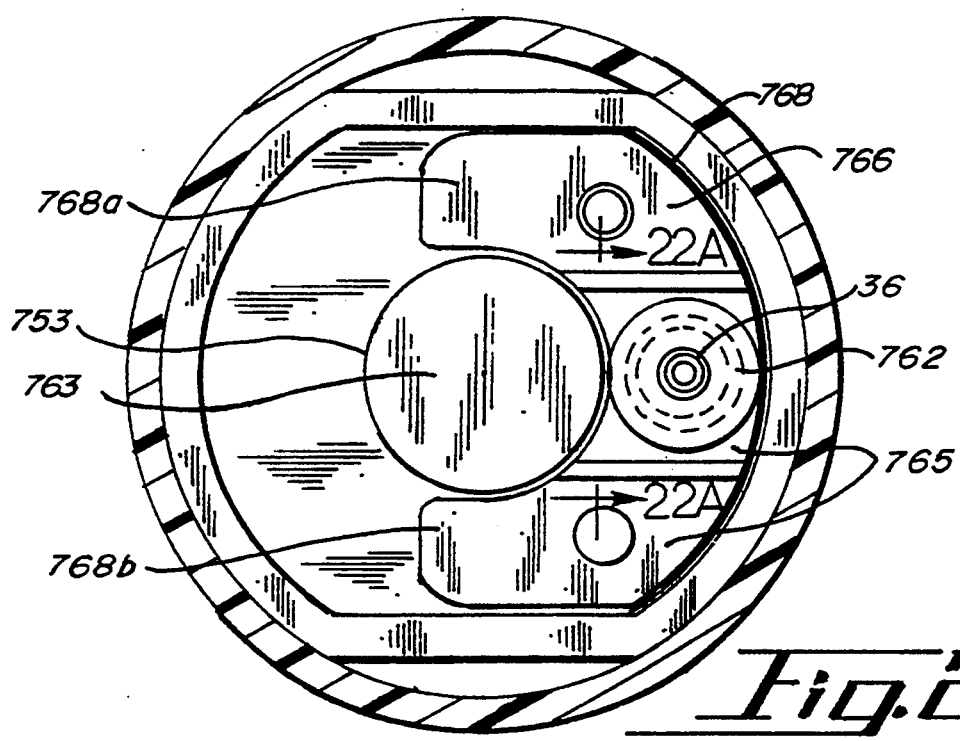
FIG. 22 is an enlarged detail section view taken along a broken line, substantially as illustrated at 22—22 of FIG. 21.
Figure 21:
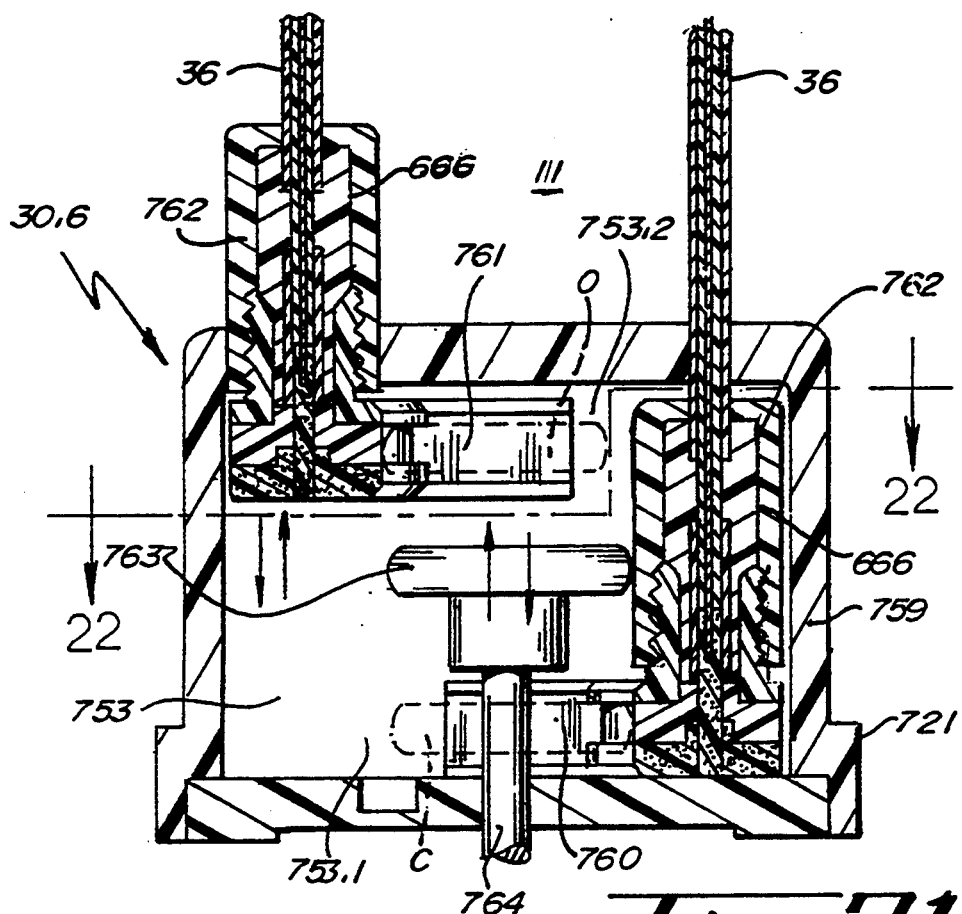
FIG. 21 is an enlarged detail section view of the form of the invention illustrated in FIG. 20 and illustrating details thereof.
Figures 22A, 23:
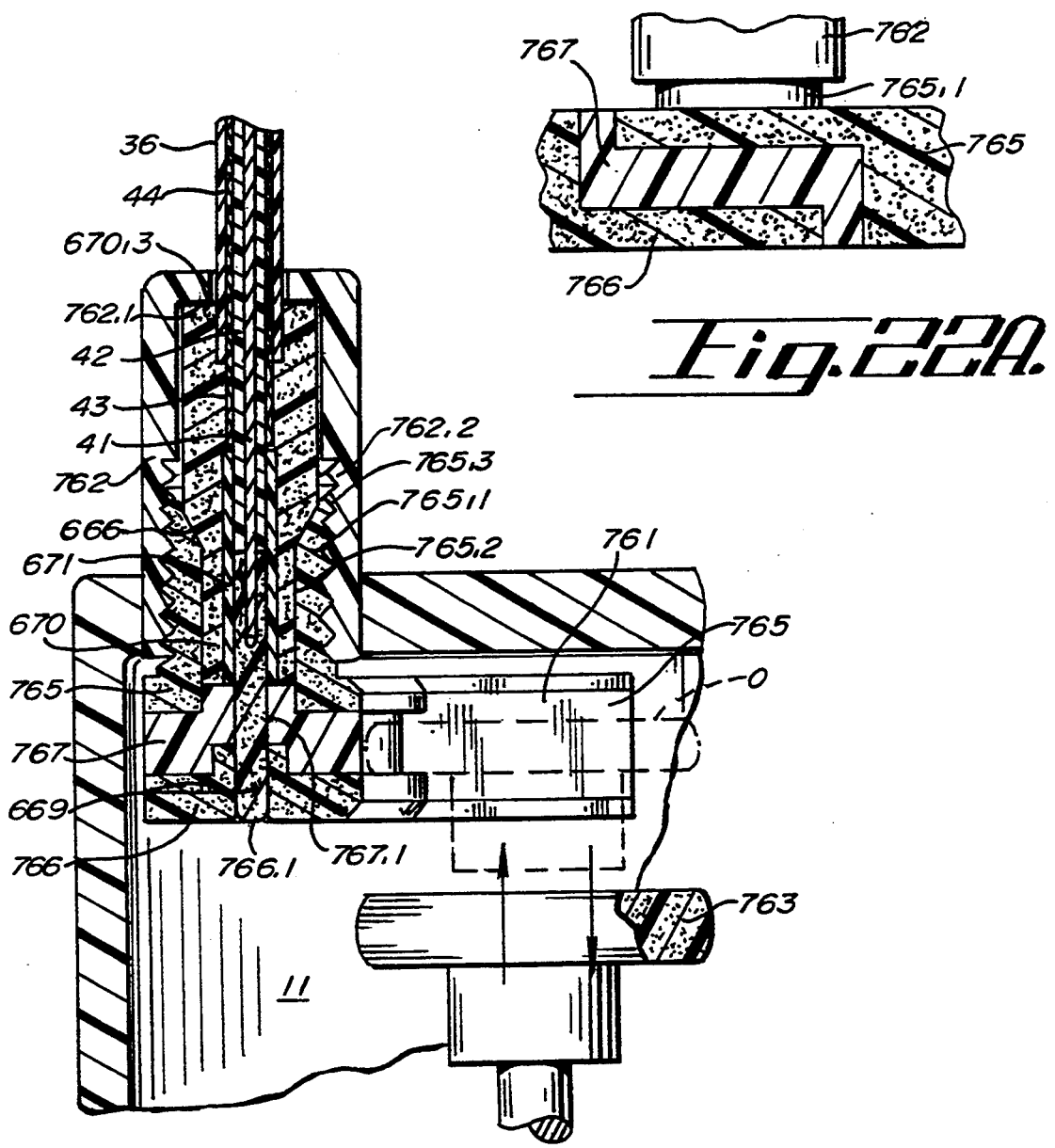
FIG. 22A is an enlarged detail section view taken approximately at 22A—22A of FIG. 22.
FIG. 23 is a greatly enlarged detail section view of a portion of the apparatus illustrated in FIG. 21.

Each of the sensors 760, 761 comprises a pair of conductive plastic sensing element extensions 765, 766 formed of conductive plastic resistant to the deteriorating effects of the corrosive atmosphere environment 11 in which the valve 721 exists. The sensing element extensions 765, 766 are substantially plate-shaped and are arranged in a sandwich relation with an insulating plastic element 767 shaped to maintain the sensing element extensions 765, 766 in spaced relation with each other. The sensing element extensions 765, 766 and the insulating spacer element 767, which is also formed of plastic resistant to the deteriorating effects of the corrosive atmosphere environment 11 in which the valve 721 exists, are molded integrally and in one piece with each other so that the assembled sensing element extensions 765, 766 and the insulating spacer element 767 form a one-piece assembly 768 which is substantially crescent shaped or horseshoe shaped, as illustrated in FIG. 22, with end portions 768a and 768b extending peripherally around the target zone 753 in which the target media or disk 763 moves between the positions O and C.

The sensing element extension 765 has an upstanding socket portion 765.1 which has a socket opening 762 which receives the probe 666 therein in friction-fitting relation and in engagement with the conductive plastic sensing element 670 of the probe 666 to be in conducting relation therewith. The threaded exterior 765.3 of the socket portion 765.1 receives the threaded interior 762.2 of the retainer cup 762 as to hold the probe in the desired position.

The other sensing element extension 766 also has a socket opening 765.1 therein, receiving the conductive plastic sensing element 669 of the probe 666 therein in friction-fitting relation as to create an electrically conductive relation between the sensing element 669 and the sensing element extension 766. An aligned opening 767.1 in the spacer portion of the crescent-shaped assembly 768 also receives the rod-shaped conductive plastic sensing element 669 therethrough.

When the target media or disk 763 moves to its upper position O or to its lower position C, the sensors 761 and 760 will produce indications as to the presence of the disk or target media 763 when it is closely adjacent one of the sensors. The target media or disk 763 has electrical characteristics that are different than the electrical characteristics of the gas or air ambient media in the target zone 753 so that the presence of the disk or target media 763 may be readily detected. As in other forms of the invention, an indication is produced by reason of the change of current due to the sensing of the target media adjacent the sensor as to produce indications that are useful for indicating the position of the disk or target media 763 and recording whether or not the valve is open or closed.

It will be seen that the present invention provides a monitoring device to determine the existence or nonexistence and position of the target media, which may, depending upon the nature of the installation, comprise a liquid, or a leakage liquid, or a physical object, or other physical media. The target media exists in a corrosive atmosphere environment 11 created by the surrounding apparatus, such as that illustrated in FIGS. 1 and 2. The sensing element or sensing elements which create a sensing field in a target zone adjacent the target media comprises a conductive plastic sensing element which may be a part of the functional operational means functioning in relation to the changeable target, or may in some instances perform the single function of creating the sensing field and functioning with the capacitance sensing circuit to determine the existence or absence of the changeable target adjacent the sensing element.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

We claim:

1. A conductive device for use in a corrosive and atmosphere environment to apply an electrical voltage for detecting the presence of a target media, comprising
    a target zone comprising an ambient media to receive such a target media, the ambient media having electrical characteristics different than the electrical characteristics of the target media,
    and a sensing probe adjacent to the target zone and comprising a substantially rigid elongate sensing element comprising electrically conductive plastic resistant to the deteriorating effects of the corrosive atmosphere environment and having a portion directly exposed to the target zone, a substantially rigid tubular sensing element comprising electrically conductive plastic resistant to the deteriorating effects of the corrosive atmosphere environment and embracing the elongate sensing element, the tubular sensing element also having a portion directly exposed to the target zone, and electrically insulating means comprising plastic resistant to the deteriorating effects of the corrosive atmosphere environment and disposed between said sensing elements.

2. A conductive device according to claim 1 wherein said elongate and tubular sensing elements comprise a rod-shaped inner end portion and an tubular-shaped outer end portion, respectively, in concentric relation with each other, said rod-shaped inner end portion protruding end-ways away from said outer tubular-shaped end portion,
    a pair of sensing element extension portions of conductive plastic resistant to the deteriorating effects of the corrosive atmosphere environment, said sensing element extension portions being spaced from each other and having aligned socket openings respectively receiving said concentric inner and outer end portions of the sensing elements.

3. A conductive device according to claim 2 and an insulating spacer comprising plastic resistant to the deteriorating effects of the corrosive atmosphere environment, said insulating spacer being located between and in fixed relation to said sensing element extension portions.

4. A conductive device for applying an electrical voltage to produce a measurable current, comprising
    a corrosive atmosphere environment having a portion defining a target zone comprising an ambient gaseous media, a target media movable into the target zone and replacing a portion of the ambient media, the target media having electrical characteristics different than the electrical characteristics of the ambient media,
    and a sensing probe comprising a sensing portion to which the voltage may be applied, the sensing portion being adjacent to the target zone and comprising a substantially rigid elongate sensing element comprising electrically conductive plastic resistant to the deteriorating effects of the corrosive atmosphere environment and having a portion directly exposed to the target zone, the sensing portion also comprising a substantially rigid tubular sensing element comprising electrically conductive plastic resistant to the deteriorating effects of the corrosive atmosphere environment, said tubular sensing element surrounding the elongate sensing element and also having a portion directly exposed to the target zone, the voltage applied to the sensing probe producing current which is affected by the target media when moved into the target zone, and electrically insulating means comprising plastic resistant to the deteriorating effects of the corrosive atmosphere environment and disposed between said sensing elements.

5. A conductive device according to claim 4 wherein said target media comprises a liquid chemical.

6. A conductive device according to claim 4 wherein said target media comprising a solid article.

7. A conductive device applying an electrical voltage into a target zone of a corrosive atmosphere environment and transmitting measurable current which perceptibly varies as the target zone is alternately partially occupied by an ambient media and a target media, comprising a sensing probe comprising a substantially rigid rod-shaped sensing element comprising electrically conductive plastic resistant to the deteriorating effects of a the corrosive atmosphere environment, a substantially rigid tubular sensing element comprising electrically conductive plastic resistant to the deteriorating effects of corrosive atmosphere environment, said tubular sensing element surrounding the rod-shaped sensing element in substantially concentric relation, the rod-shaped sensing element protruding endways from the tubular sensing element whereby to expose the transverse periphery of the rod-shaped sensing element to the ambient media and target media in the target zone, and an insulating and tubular spacer comprising an insulating plastic resistant to the deteriorating effects of the corrosive atmosphere environment, said spacer being disposed between said rod shaped sensing element and said tubular sensing element and surrounding the rod-shaped element in concentric relation.

8. A conductive device according to claim 7 wherein the insulating and tubular spacer is formed integrally of and in one piece with one of said sensing elements.

9. A conductive device according to claim 7 wherein said insulating and tubular spacer is formed integrally of and in one piece with both of said sensing elements.

10. A conductive device according to claim 7 wherein said tubular sensing element comprises an elongate mounting portion having a pair of transverse mounting surface portions facing in generally opposite directions.

11. A conductive device according to claim 10 wherein one of said transverse mounting surfaces is oriented obliquely of said elongate mounting portion.

12. A conductive device according to claim 10 wherein one of said transverse surface portions is tapered.

13. A conductive device according to claim 7 wherein an electrically conductive cable comprises a first end portion connected onto said conductive sensing elements, said conductive cable comprising a pair of conductor portions each electrically connected to one of said rod-shaped and tubular sensing elements.

14. A conductive device according to claim 13 wherein said conductor portions of the conductive cable are metal and are sealed in isolated relation to the exteriors of said sensing elements as to remain isolated from the corrosive atmosphere environment embracing the sensing elements.

15. A conductive device according to claim 14 wherein said conductive cable comprises a protective jacket confining said conductor portions in sealed relation.

16. A conductive device according to claim 13 wherein said pair of conductor portions are substantially concentric of each other and comprise an inner metal conductor portion and an outer metal conductor portion receiving said inner conductor portion therein, said outer conductor portion being substantially electrically grounded.

17. A conductive device according to claim 14 wherein said sensing element extension portions respectively extend in opposite directions from said socket openings.

* * * * *

UNITED STATES PATENT AND TRADEMARK OFFICE
CERTIFICATE OF CORRECTION

PATENT NO. : 5,449,017
DATED : September 12, 1995
INVENTOR(S) : Timothy R. Collins, et al It is certified that error appears in the above-indentified patent and that said Letters Patent is hereby corrected as shown below:

Column 11, line 19, please delete the number "38.1" and insert in its place --36.1--.

Column 12, line 56, please delete the mark "!" and insert in its place --.--.

Column 15, line 28, please delete the number "32" and insert in its place --33--.

Column 17, line 40, please delete the word "part" and insert in its place --port--.

Column 17, line 46, please delete the number "667.2" and insert in its place --672.2--.

Column 19, line 16, please delete the number "762" and insert in its place --765.2--.

Signed and Sealed this

Nineteenth Day of December, 1995

Attest:

BRUCE LEHMAN

*Attesting Officer*     *Commissioner of Patents and Trademarks*